(12) United States Patent
Molev-Shteiman

(10) Patent No.: US 7,653,029 B2
(45) Date of Patent: Jan. 26, 2010

(54) METHOD AND SYSTEM FOR A VARIABLE SPREADING FACTOR WALSH HADAMARD TRANSFORM ENGINE

(75) Inventor: Arkady Molev-Shteiman, Bney Barak (IL)

(73) Assignee: Broadcom Corporation, Irvine, CA (US)

( * ) Notice: Subject to any disclaimer, the term of this patent is extended or adjusted under 35 U.S.C. 154(b) by 499 days.

(21) Appl. No.: 11/452,009

(22) Filed: Jun. 13, 2006

(65) Prior Publication Data

US 2007/0286261 A1    Dec. 13, 2007

(51) Int. Cl.
*H04B 7/216* (2006.01)
(52) U.S. Cl. ........................ 370/335; 370/342
(58) Field of Classification Search ............ 370/342, 370/335; 375/148, 144, 267, 418
See application file for complete search history.

(56) References Cited

U.S. PATENT DOCUMENTS 5,966,377 A * 10/1999 Murai .................... 370/342
7,009,958 B1 * 3/2006 Gerakoulis ............. 370/342

* cited by examiner

*Primary Examiner*—Charles N Appiah
*Assistant Examiner*—Kiet Doan
(74) *Attorney, Agent, or Firm*—McAndrews, Held & Malloy, Ltd.

(57) ABSTRACT

Aspects of a method and system for a variable spreading factor Walsh Hadamard Transform engine are presented. Aspects of the system may include a variable spreading factor Fast Walsh Hadamard Transform engine that enables spread spectrum encoding of data from each of a plurality of data sources. A plurality of spreading factors may be utilized wherein at least 2 of the plurality of spreading factors differ. The variable spreading factor Fast Walsh Hadamard Transform engine may enable combination of a plurality of spread spectrum encoded data to form a data vector.

18 Claims, 15 Drawing Sheets

METHOD AND SYSTEM FOR A VARIABLE SPREADING FACTOR WALSH HADAMARD TRANSFORM ENGINE

CROSS-REFERENCE TO RELATED APPLICATIONS/INCORPORATION BY REFERENCE

Not Applicable

FIELD OF THE INVENTION

Certain embodiments of the invention relate to wireless communication. More specifically, certain embodiments of the invention relate to a method and system for a variable spreading factor Walsh Hadamard transform engine.

BACKGROUND OF THE INVENTION

Mobile communication has changed the way people communicate and mobile phones have been transformed from a luxury item to an essential part of every day life. The use of mobile phones is today dictated by social situations, rather than hampered by location or technology. While voice connections fulfill the basic need to communicate, and mobile voice connections continue to filter even further into the fabric of every day life, the mobile Internet is the next step in the mobile communication revolution. The mobile Internet is poised to become a common source of everyday information, and easy, versatile mobile access to this data will be taken for granted.

Third generation (3G) cellular networks have been specifically designed to fulfill these future demands of the mobile Internet. As these services grow in popularity and usage, factors such as cost efficient optimization of network capacity and quality of service (QoS) will become even more essential to cellular operators than it is today. These factors may be achieved with careful network planning and operation, improvements in transmission methods, and advances in receiver techniques. To this end, carriers need technologies that will allow them to increase downlink throughput and, in turn, offer advanced QoS capabilities and speeds that rival those delivered by cable modem and/or DSL service providers. In this regard, networks based on wideband CDMA (WCDMA) technology may make the delivery of data to end users a more feasible option for today's wireless carriers.

WCDMA networks may allow a mobile handset to communicate with a plurality of base stations. This may take place, for example, during a soft-handoff from one base station to another base station that utilizes the same frequency band. On occasions, there may be handoffs from one base station to another where the two base stations use different frequencies. This may occur, for example, when a mobile station interfaces with a different wireless service provider, or for hotspots where one service provider may need to use more than one frequency. In these cases, the mobile handset may need to tune in to the frequency of the new base station. Additional circuitry may be required to synchronize to a second frequency of the second base station while still using the first frequency for communicating with the first base station. The additional synchronization circuitry may be an undesirable extra cost for the mobile handset.

Further limitations and disadvantages of conventional and traditional approaches will become apparent to one of skill in the art, through comparison of such systems with some aspects of the present invention as set forth in the remainder of the present application with reference to the drawings.

BRIEF SUMMARY OF THE INVENTION

A system and/or method for a variable spreading factor Walsh Hadamard transform engine, substantially as shown in and/or described in connection with at least one of the figures, as set forth more completely in the claims.

These and other advantages, aspects and novel features of the present invention, as well as details of an illustrated embodiment thereof, will be more fully understood from the following description and drawings.

DETAILED DESCRIPTION OF THE INVENTION

Certain embodiments of the invention relate to a method and a system for a variable spreading factor Walsh Hadamard transform engine. Various embodiments of the invention may comprise a method for transmitting data via a wireless medium. Aspects of the method may comprise spread spectrum encoding of data from a plurality of data sources using Walsh codes. Different spreading factors, which may define a length for the corresponding Walsh code, as measured in bits, for example, may be utilized to encode data from different sources. The plurality of spread spectrum encoded data may be combined to form a data vector. The data vector may be encoded utilizing a scrambling code and subsequently transmitted via the wireless medium.

Various embodiments of the invention may also comprise a method for receiving encoded data vectors via a wireless medium. The encoded data vector may comprise data from a plurality of data sources, or users. Aspects of the method may comprise decoding, or descrambling, the received encoded data vector utilizing a descrambling code. The descrambling code may correspond to a conjugate version of a scrambling code utilized to encode data contained within the encoded data vector. A data vector computed as a result of the descrambling may be spread spectrum decoded, or despread using Walsh codes. Different spreading factors may be utilized to decode encoded data from different users.

Figure 1:
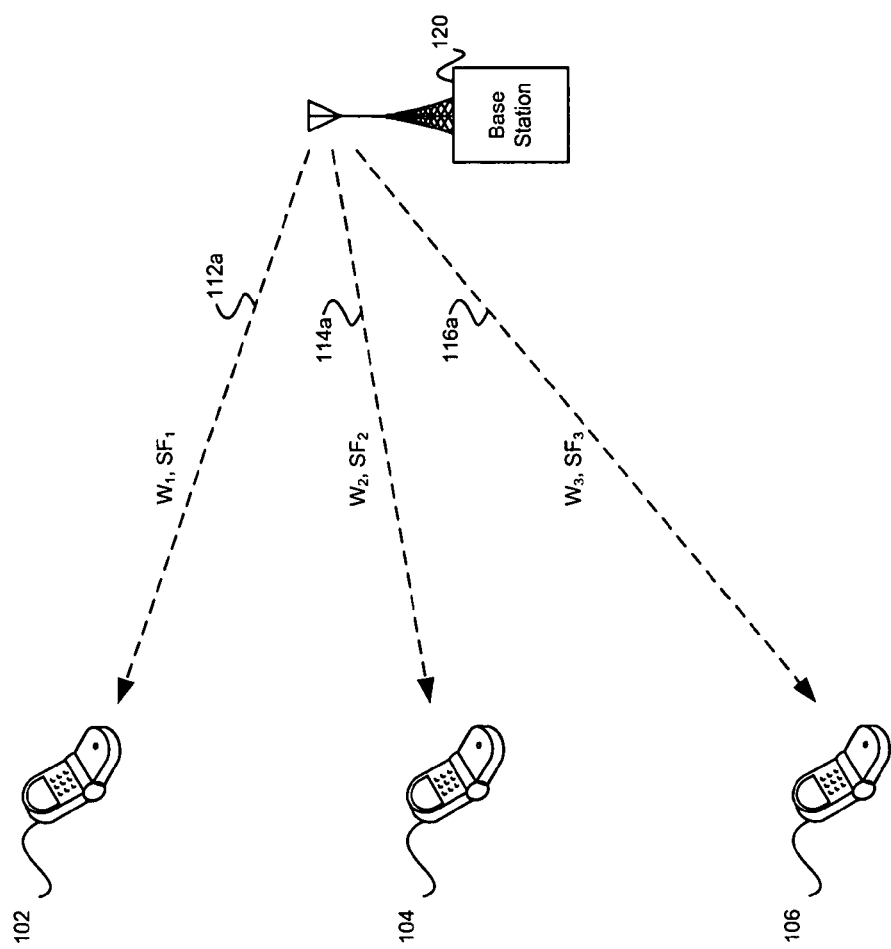
FIG. 1 is an exemplary diagram illustrating a WCDMA base station transmitting signals to three WCDMA users, which may be utilized in connection with an embodiment of the invention.

FIG. 1 is an exemplary diagram illustrating a WCDMA base station transmitting signals to three WCDMA users, which may be utilized in connection with an embodiment of the invention. Referring to FIG. 1, there is shown a plurality of mobile terminals 102, 104, and 106, and a base station 120. Each mobile terminal may correspond to a user where mobile terminal 102 may correspond to user #1, mobile terminal 104 may correspond to user #2, and mobile terminal 106 may correspond to user #3. The base station 120 may simultaneously communicate information to each of the mobile terminals 102, 104, and 106. The base station 120 may communicate information to mobile terminal 102 via RF channel 112a, for example. The base station 120 may communicate information to mobile terminal 104 via RF channel 114a, for example. The base station 120 may communicate information to mobile terminal 106 via RF channel 116a, for example. In a WCDMA communication system, the RF channels 112a, 114a, and 116a may simultaneously utilize the same frequency range. At the mobile terminal 102, for example, RF channels 114a and 116a may comprise interference signals.

To prevent interference from RF channels 114a and 116a at the mobile terminal 102, the base station 120 may spread spectrum encode information being communicated to the mobile terminal 102 utilizing a Walsh code, $W_1$, with a spreading factor, $SF_1$. The mobile terminal 102 may apply a corresponding spreading factor, $SF_1$, to signals received via RF channels 112a, 114a, and 116a. The utilization of the spreading factor may enable the mobile terminal 102 to receive information transmitted from the base station 120 via RF channel 112a.

Similarly, a Walsh code, $W_2$, with a spreading factor $SF_2$ may be utilized by the base station 120 to communicate information to the mobile terminal 104 via RF channel 114a. Furthermore, a Walsh code, $W_3$, with a spreading factor $SF_3$ may be utilized by the base station 120 to communicate information to the mobile terminal 106 via RF channel 116a.

In some conventional WCDMA communication systems, the base station 120 may be limited to utilizing spreading factors for which $SF_3=SF_2=SF_1$. In various embodiments of the invention, the base station 120 may not be so limited and may independently select spreading factor values for which $SF_3 \neq SF_2 \neq SF_1$, for example.

Figure 2:
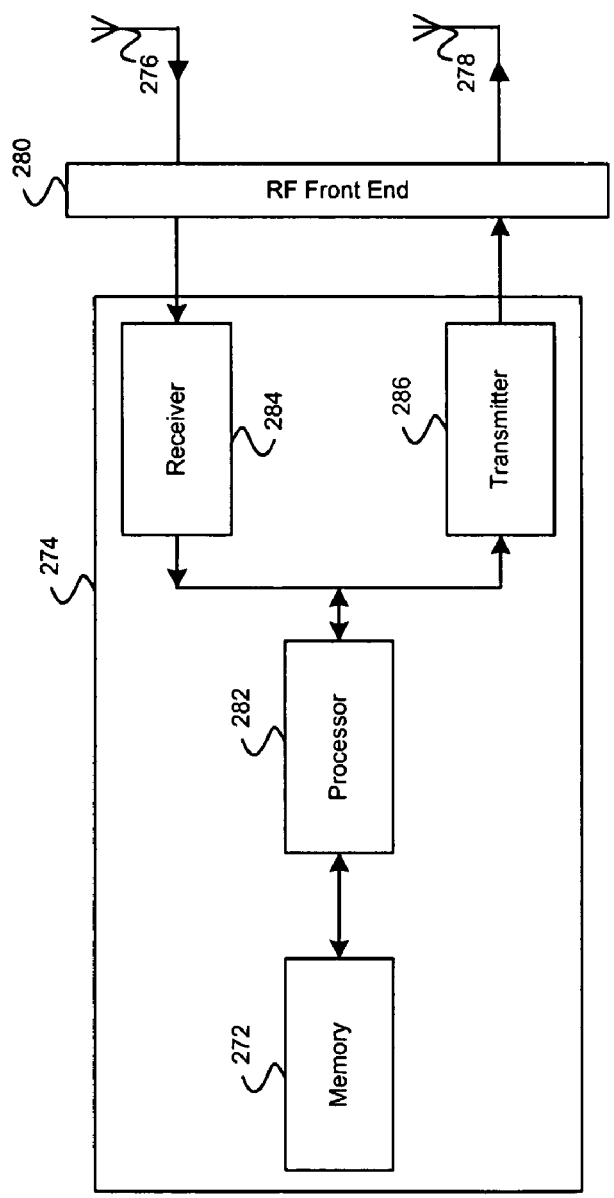
FIG. 2 is a block diagram of an exemplary wireless transceiver system that may be utilized in connection with an embodiment of the invention.

FIG. 2 is a block diagram of an exemplary wireless transceiver system that may be utilized in connection with an embodiment of the invention. The wireless transceiver may be utilized in connection with the base station 120 (FIG. 1), for example. With reference to FIG. 2 there is shown a transceiver 274, an RF front end 280, one or more receiving antennas 276, and one or more transmitting antennas 278. The transceiver 274 may comprise a processor 282, memory 272, a receiver 284, and a transmitter 286.

The processor 282 may perform digital receiver and/or transmitter functions in accordance with applicable communications standards. These functions may comprise, but are not limited to, tasks performed at lower layers in a relevant protocol reference model. These tasks may further comprise the physical layer convergence procedure (PLCP), physical medium dependent (PMD) functions, and associated layer management functions. These tasks may further comprise medium access control (MAC) layer functions as specified by pertinent standards.

The processor 282 may also enable computation of a group of chips based on a spreading factor, a Walsh code, and data to be transmitted to a user via an RF channel. The group of chips may comprise spread spectrum encoded data. The processor 282 may enable computation of a plurality of groups of chips for a corresponding plurality of users. The plurality of groups of chips may be combined to form a data vector. The processor 282 may enable the data vector to be further encoded utilizing a scrambling code.

The processor 282 may enable descrambling of a received signal utilizing a descrambling code and subsequent computation of received data based on a group of chips received from a user via an RF channel, a spreading factor, and a Walsh code. The group of chips may be contained in a received data vector. The processor 282 may enable computation of subsequent received data based on a subsequent group of chips received from a subsequent user via an RF channel, a subsequent spreading factor, and a subsequent Walsh code. The subsequent group of chips may be contained in the received data vector.

The memory 272 may comprise suitable logic, circuitry, and/or code that may be utilized to enable storage and/or retrieval of data and/or code. Stored code may, for example, comprise algorithms for computation of Hadamard transforms utilizing variable spreading factors. The variable spreading factors may enable a different spreading factor value to be utilized for each of the users whose data is contained in a data vector. Stored data may, for example, comprise spreading factor data, Walsh codes, data to be transmitted, and/or intermediate results during computation of chips. Retrieved data and/or code may be assigned physical resources within the memory 272 for the storage. The stored data and/or code may be subsequently available for retrieval. Retrieved data and/or code may be output by the memory 272 and communicated to other devices, components, and/or subsystems that may be communicatively coupled, directly and/or indirectly, to the memory 272. The memory 272 may enable the stored data and/or code to remain stored and/or available for subsequent retrieval until the resources allocated for the storage are deallocated. Physical resources may be deallocated based on a received instruction that the stored data and/or code be erased from the memory 272, or based on a received instruction that the physical resources be allocated for the storage of subsequent data and/or code. The memory may utilize a plurality of storage medium technologies such as volatile memory, for example, random access memory (RAM), and/or nonvolatile memory, for example, electrically erasable programmable read only memory (EEPROM).

The receiver 284 may perform digital receiver functions that may comprise, but are not limited to, fast Fourier transform processing, demapping, demodulation control, deinterleaving, depuncture, and decoding. The transmitter 286 may perform digital transmitter functions that comprise, but are not limited to, coding, puncture, interleaving, mapping, modulation control, inverse fast Fourier transform processing. The RF front end 280 may receive analog RF signals via the one or more antennas 276, by converting the RF signal to baseband and generating a digital equivalent of the received analog baseband signal. The RF front end 280 may also transmit analog RF signals via an antenna 278, by converting a digital baseband signal to an analog RF signal.

In operation, the processor 282 may receive signals from the receiver 284. The processor 282 may descramble the signals received from the receiver 282 utilizing a descrambling code. The descrambled signals may comprise data vectors. The processor 282 may apply one or more spreading factors to extract data received from one of a plurality of users. The processor 282 may communicate received data from each of the plurality of users to the memory 272 for storage. The processor 282 may enable retrieval of data from the memory 272 to be transmitted via an RF channel by the transmitter 286. The retrieved data may correspond to a plurality of users, each of which may receive a portion of the retrieved data. The memory 272 may communicate the data to the processor 282. The processor may compute a data vector corresponding to a plurality of users based on a corresponding portion of the retrieved data, a corresponding Walsh code, and a corresponding spreading factor. The processor 282 or may generate signals by scrambling the data vector utilizing a scrambling code. The processor 282 may communicate the scrambled data vector to the transmitter 286. The processor 282 may also generate signals to control the operation of the modulation process in the transmitter 286, and of the demodulation process in the receiver 284.

Figure 3:
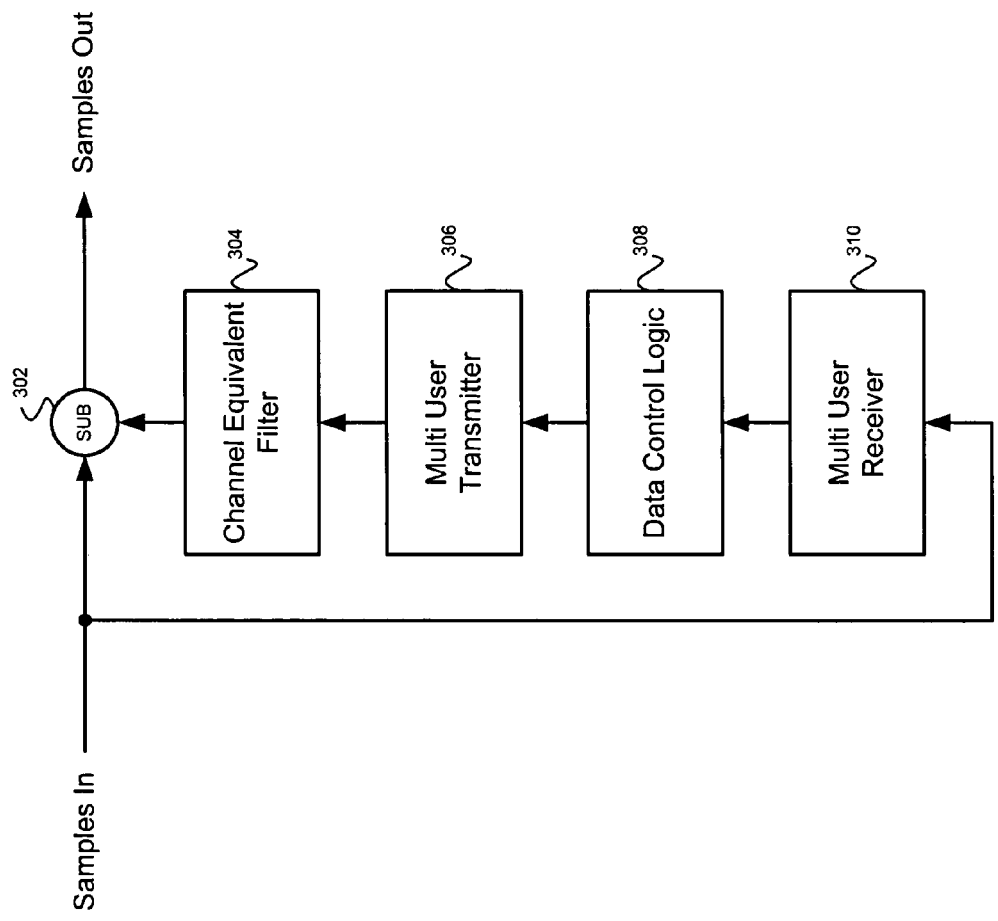
FIG. 3 is a flow chart illustrating exemplary steps for multi-user interference suppression, which may be utilized in connection with an embodiment of the invention.

FIG. 3 is a flow chart illustrating exemplary steps for multi-user interference suppression, which may be utilized in connection with an embodiment of the invention. Multi-user interference suppression is a procedure that may enable a mobile terminal 102 to receive an RF channel 112a from among a plurality of simultaneously received RF channels 112a, 114a, and 116a. The procedure may comprise cancelling interference from the RF channels 114a, and 116a from the plurality of simultaneously received RF channels.

Referring to FIG. 3, there is shown an input, Samples In. The Samples In may refer to information simultaneously received at the mobile terminal 102, from a base station 120. A multi-user receiver 310 receives the Samples In input. The multi-user receiver 310 may be implemented as a receiver 284, an RF front end 280, one or more antennas 276, a processor 282, and/or memory 272. The multi-user receiver 310 may enable recovery of a received signal representing the plurality of RF channels 112a, 114a, and 116a. The data control logic 308 may represent algorithms that enable the multi-user transmitter 306 to regenerate a data vector comprising combined data simultaneously transmitted via the plurality of simultaneously received RF channels. The multi-user transmitter may be implemented as a transmitter 286, an RF front end 280, one or more antennas 278, a processor 282, and/or memory 272. The channel equivalent filter 304 may enable generation of a filtered data vector. The data received from a selected user may be removed from the regenerated data vector to generate the filtered data vector. The subtractor 302 may generate an output, Samples Out, based on subtraction of the filtered data vector from the Samples In input. The Samples Out output may comprise data for the selected user, for example user #1.

One aspect of the invention may comprise methods that implement functions performed by the multi-user receiver 310. Another aspect of the invention may comprise methods that implement functions performed by the multi-user transmitter 306.

For a multi-user transmitter 306, a transmitted WCDMA downlink signal may comprise the combined RF channels 112a, 114a, and 116a, for example. The transmitted WCDMA downlink signal may be described as in the following equation:

$$TX(t) = \sum_{n=-\infty}^{\infty} TX(n) \cdot \Pi\left(\left[\frac{t - n \cdot T_C}{T_C}\right]\right) \quad \text{Equation [1]}$$

where TX(n) may represent a $n^{th}$ transmitted chip, $T_c$ may represent a chip duration (1/3.84 MHz, for example), the expression [x] may represent an integer portion of a number represented by the variable x, and the expression π(t) may evaluate to a value 1 for values 0≦t<1, and may evaluate to a value 0 for other values of the variable t.

The expression TX(n) may be represented as in the following equation:

$$TX(n) = C(n) \cdot \sum_{m=0}^{M-1} W_m(n) \cdot A_m \cdot D_m\left(\left[\frac{n}{SF_m}\right]\right) \quad \text{Equation [2]}$$

where C(n) may represent a scrambling code for the $n^{th}$ transmitted chip, $W_m(n)$ may represent a Walsh code for the $n^{th}$ transmitted chip from an $m^{th}$ user, $A_m$ may represent an amplitude associated with the $m^{th}$ user, M may represent a total number of users, $D_m(n)$ may represent the $n^{th}$ transmitted data bit from the $m^{th}$ user, and $SF_m(n)$ may represent a spreading factor for the $m^{th}$ user.

In an exemplary embodiment of the invention the following values may be utilized:

$C(n) = \pm\sqrt{0.5} \pm j \cdot \sqrt{0.5}$      Equation [3a]

$W_m(n) = \pm 1$      Equation [3b]

$D_m(n) = \pm 1$      Equation [3c]

$SF_m = 4, 8, 16, 32, 64, 128,$ or $256$      Equation [3d]

The Walsh code may comprise a periodic sequence. In a WCDMA communication system the period, represented by the variable N, may equal the maximum spreading factor values. For example, where spreading factor values may be represented as in Equation [3d], the period may be for the Walsh code may be N=256. The number of possible distinct Walsh codes may be equal to the value for the period. For example, when the period is N=256, the number of possible distinct Walsh codes may equal 256. Each Walsh code may be orthogonal to the other distinct Walsh codes. The orthogonality property may be expressed as in the following equation:

$$\sum_{n=0}^{N-1} W_m(n) \cdot W_k(n) = \begin{Bmatrix} N & m=k \\ 0 & \text{else} \end{Bmatrix} \quad \text{Equation [4]}$$

During the period N=256, for example, an $m^{th}$ user may transmit $$\frac{256}{SF_m}$$

bits.

The total number of bits $\hat{M}$ transmitted by the plurality of M users may be expressed as in the following equation:

$$\hat{M} = \sum_{m=0}^{M-1} \left(\frac{256}{SF_m}\right) \quad \text{Equation [5]}$$

Each of the Walsh codes $W_m(n)$ and spreading factors $SF_m$ may be selected such that a data bit $D_m(n)$ is orthogonal to a data bit $D_k(n)$ for $k \ne n$. Therefore, for N=256, $\hat{M} \le 256$.

A transmitter data vector, $D_{IN}$, may be defined that comprises bits to be transmitted to the M users during a period N=256, for example. A bit m' from the $m^{th}$ user may correspond to a bit $\hat{m}$ in the data vector. The data vector may be expressed as in the following equation:

$$D_{IN}(\hat{m}) = A_m \cdot D_m(m') \quad \text{Equation [6a]}$$
where:

$$\hat{m} = \sum_{q=0}^{m-1} \left(\frac{256}{SF_q}\right) + m' \quad \text{Equation [6b]}$$

Based on equations [6a] and [6b], equation [2] may be expressed:

$$TX(n) = C(n) \cdot \sum_{\hat{m}=0}^{\hat{M}-1} W_m(n) \cdot \Pi\left(\left[\frac{n}{SF_m}\right] - m'\right) \cdot D_{IN}(\hat{m}) \quad \text{Equation [7a]}$$

or alternatively:

$$TX(n) = C(n) \cdot \sum_{\hat{m}=0}^{\hat{M}-1} W_{\hat{m}}(n) \cdot D_{IN}(\hat{m}) \quad \text{Equation [7b]}$$
where:

$$W_{\hat{m}}(n) = W_m(n) \cdot \Pi\left(\left[\frac{n}{SF_m}\right] - m'\right) \quad \text{Equation [7c]}$$

In equation [7b], the summation:

$$\sum_{\hat{m}=0}^{\hat{M}-1} W_{\hat{m}}(n) \cdot D_{IN}(\hat{m}) \quad \text{Equation [8]}$$

may represent a Walsh Hadamard Transform operation that may be implemented with a Fast Walsh Hadamard Transform engine.

In some conventional systems, implementations of the equation [8] in a Fast Walsh Hadamard Transform engine may be limited to cases wherein a value for a spreading factor $SF_m$ may be equal to a value for a spreading factor $SF_k$ for $m \ne k$. In various embodiments of the invention, the equation [8] may be implemented in a Fast Walsh Hadamard Transform engine wherein a value for a spreading factor $SF_m$ may vary and does not have to be equal to a value for a spreading factor $SF_k$ for $m \ne k$.

For a multi-user receiver 310, a received WCDMA downlink signal may comprise the combined RF channels 112a, 114a, and 116a, for example. The received WCDMA downlink signal may be described as in the following equation:

$$RX(n) = \text{Gain} \cdot TX(n) + \text{Noise}(n) \quad \text{Equation [9]}$$

where RX(n) may represent an $n^{th}$ received signal output from a chip matched filter, gain is a signal gain measure associated with the multi-user receiver 310, and Noise(n) may represent additive noise. The chip matched filter may process a received WCDMA downlink signal based on multi path propagation, and/or other signal distortions, for example, which may occur while signals are propagated through a wireless medium via the RF channels 112a, 114a, and/or 116a. The $n^{th}$ received signal may correspond to a signal transmitted for a user #n via an RF channel. The noise(n) may comprise thermal noise, multi-user interference for signals of other RF channels, and/or other sources, for example.

In the multi-user receiver 310, an estimated value for a data bit, $D_m(n)$, may be computed for each user m as in the following equation:

$$\hat{D}_m(k) = \sum_{n=(k-1)SF_m}^{k \cdot SF_m - 1} conj(C(n) \cdot W_m(n)) \cdot RX(n) \quad \text{Equation [10]}$$

where conj(x) may represent a conjugate value for the variable x, $SF_m$ may represent a spreading factor, and $\hat{D}_m(k)$ may represent an estimated value for a $k^{th}$ bit received from the $m^{th}$ user. The spreading factor $SF_m$ may be substantially as described for the spreading factor $SF_m$ in equations [2] through [8].

An estimated value for the transmitted data vector $D_{IN}(\hat{m})$ received at the multi-user receiver 310 may be computed as in the following equation when the Walsh code period N=256, for example:

$$D_{OUT}(\hat{m}) = \sum_{n=0}^{255} W_{\hat{m}}(n) \cdot conj(C(n)) \cdot RX(n) \quad \text{Equation [11]}$$

where $D_{OUT}(\hat{m})$ may represent an estimated value for a corresponding bit in the transmitted data vector $D_{IN}(\hat{m})$, and the Walsh code, $W_m(n)$, is as defined in equation [7c].

Based on equations [7c] and [9], equation [11] may be represented as in the following equation when N=256, for example:

$$D_{OUT}(\hat{m}) = \sum_{n=0}^{255} W_{\hat{m}}(n) \cdot conj(C(n)) \cdot \left( Gain \cdot \left( C(n) \cdot \sum_{\hat{p}=0}^{\hat{M}-1} W_{\hat{p}}(n) \cdot D_{IN}(\hat{p}) \right) + Noise(n) \right) \quad \text{Equation [12]}$$

where:

$$conj(C(n)) \cdot C(n) = 1 \quad \text{Equation [13]}$$

Equation [12] may be represented as in the following equation:

$$D_{OUT}(\hat{m}) = Gain \cdot \sum_{n=0}^{255} W_{\hat{m}}(n) \cdot \sum_{\hat{p}=0}^{\hat{M}-1} W_{\hat{p}}(n) \cdot D_{IN}(\hat{p}) + \sum_{n=0}^{255} W_{\hat{m}}(n) \cdot conj(C(n)) \cdot Noise(n) \quad \text{Equation [14]}$$

Based on equation [4], equation [14] may be represented as in the following equation:

$$D_{OUT}(\hat{m}) = 255 \cdot Gain \cdot D_{IN}(\hat{m}) + \sum_{n=0}^{255} W_{\hat{m}}(n) \cdot conj(C(n)) \cdot Noise(n) \quad \text{Equation [15]}$$

for small values for the noise(n), equation [15] may be approximated as in the following equation:

$$D_{OUT}(\hat{m}) \approx 255 \cdot Gain \cdot D_{IN}(\hat{m}) \quad \text{Equation [16]}$$

Equation [10] may be rewritten as in the following equation:

$$\hat{D}_m(k) = \sum_{n=(k-1)SF_m}^{k \cdot SF_m - 1} W_m(n) \cdot (conj(C(n)) \cdot RX(n)) \quad \text{Equation [17]}$$

Based on equation [17] the received data bits $\hat{D}_m(k)$ may be simultaneously computed for each user m by utilizing an inverse Walsh Hadamard Transform operation that may be implemented with a Fast Walsh Hadamard Transform engine.

In some conventional systems, implementations of the equation [17] in a Fast Walsh Hadamard Transform engine may be limited to cases wherein a value for a spreading factor $SF_m$ may be equal to a value for a spreading factor $SF_k$ for m≠k. In various embodiments of the invention, the equation [17] may be implemented in a Fast Walsh Hadamard Transform engine wherein a value for a spreading factor $SF_m$ may vary and does not have to be equal to a value for a spreading factor $SF_k$ for m≠k.

Figure 4:
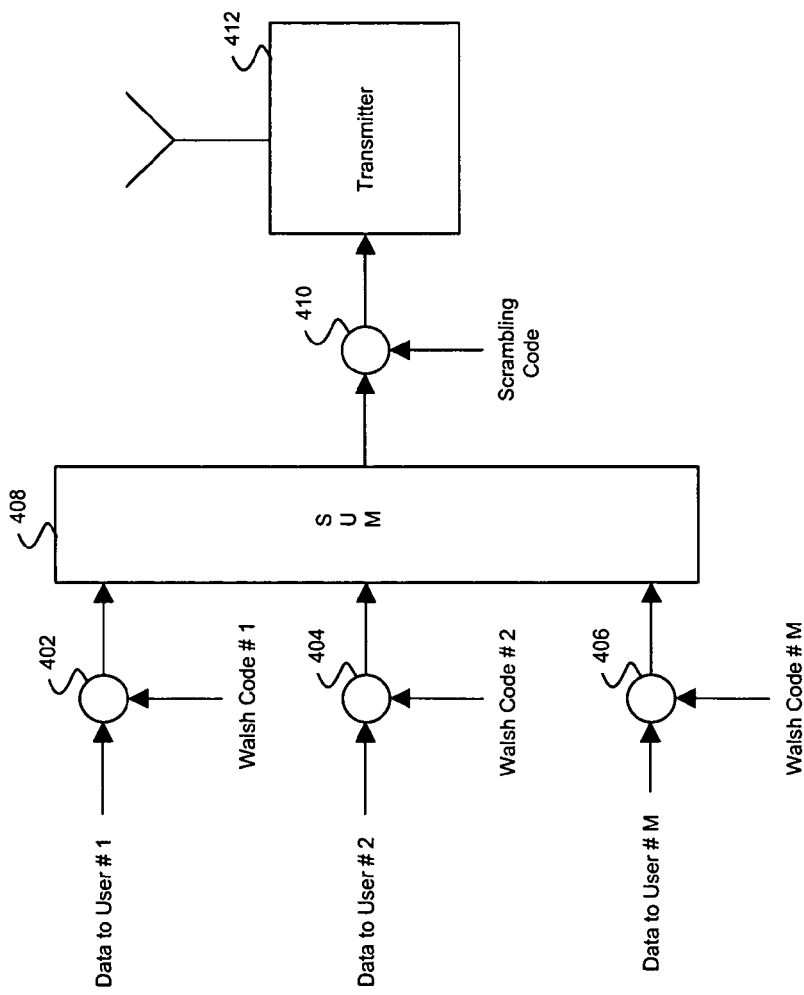
FIG. 4 is an exemplary block diagram illustrating a WCDMA downlink multi-user transmitter, which may be utilized in connection with an embodiment of the invention.

FIG. 4 is an exemplary block diagram illustrating a WCDMA downlink multi-user transmitter, which may be utilized in connection with an embodiment of the invention. FIG. 4 may illustrate an exemplary implementation of a conventional multi-user transmitter 306. Referring to FIG. 4, there is shown a plurality of Walsh code blocks 402, 404, and 406, a summing block 408, a scrambling code block 410, and a transmitter 412. The processor 282 (FIG. 2) may comprise at least a portion of the functionality of the Walsh code blocks 402, 404, and 406, at least a portion of the functionality of the summing block 408, and at least a portion of the functionality of the scrambling code block 410. The transmitter 412 may comprise at least a portion of the functionality of the transmitter 286, RF front end 280, and antenna 278.

The Walsh code block 402 may receive input data to be transmitted to user #1 via an RF channel 112a. The user #1 may utilize a mobile terminal 102. The Walsh code block 402 may utilize equation [8] to compute a group of chips based on data to be transmitted to the user #1 corresponding to user m=0 based on a Walsh code $W_1$, and a spreading factor, SF, for example. The Walsh code block 404 may receive input data to be transmitted to user #2 via an RF channel 114a. The user #2 may utilize a mobile terminal 104. The Walsh code block 404 may utilize equation [8] to compute a group of chips based on data to be transmitted to the user #2 corresponding to user m=1 based on a Walsh code $W_2$, and the spreading factor, SF, for example. The Walsh code block 406 may receive input data to be transmitted to user #3 via an RF channel 116a. The user #3 may utilize a mobile terminal 106. The Walsh code block 406 may utilize equation [8] to compute a group of chips based on data to be transmitted to the user #3 corresponding to user m=2 based on a Walsh code $W_3$, and the spreading factor, SF, for example. In some implementations of a conventional multi-user transmitter 306, the value for the spreading factor, SF, utilized by Walsh code blocks 402, 404, and 406, may be about equal.

The summing block 408 may generate a transmitted data vector $D_{IN}$ based on the plurality of groups of chips computed by the corresponding plurality of Walsh code blocks 402, 404, and 406. The number of groups of chips may correspond to the number of users M=3, for example. The scrambling code block 410 may encode the transmitted data vector by utilizing a scrambling code. The transmitter 412 may transmit the scrambling code encoded transmitted data vector via a plurality of RF channels 112a, 114a, and 116a, for example.

Figure 5:
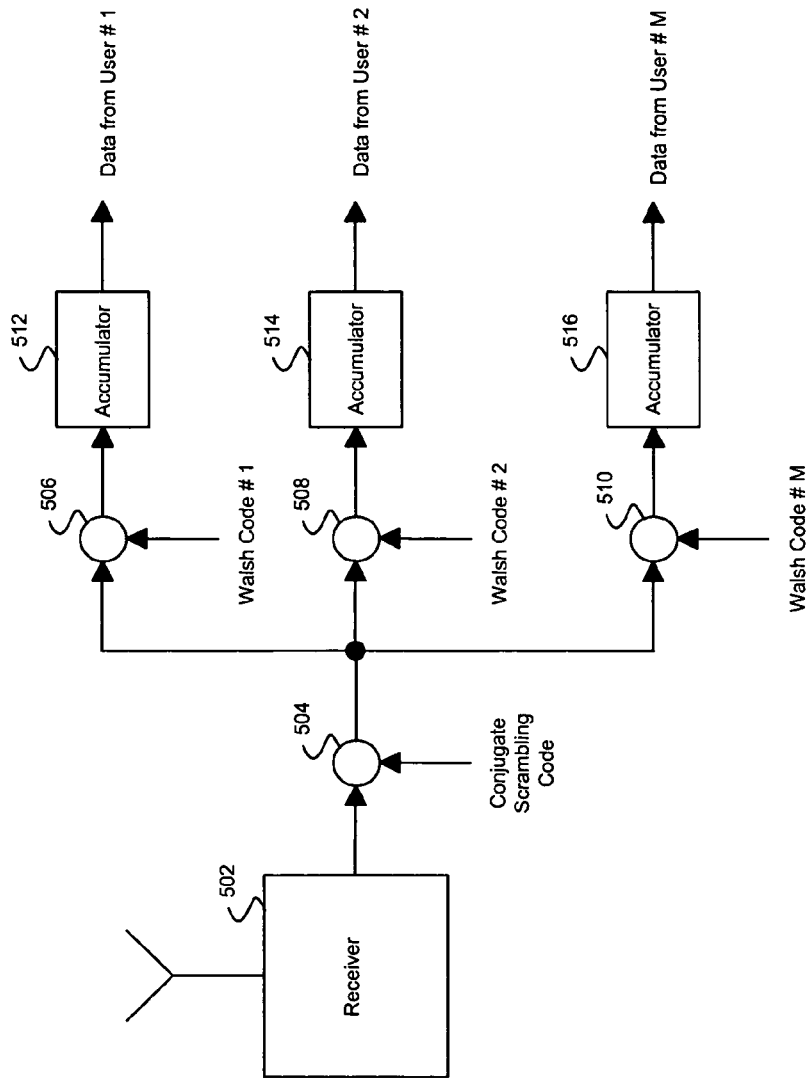
FIG. 5 is an exemplary block diagram illustrating a WCDMA downlink multi-user receiver, which may be utilized in connection with an embodiment of the invention.

FIG. 5 is an exemplary block diagram illustrating a WCDMA downlink multi-user receiver, which may be utilized in connection with an embodiment of the invention. FIG. 5 may illustrate an exemplary implementation of a conventional multi-user receiver 310. Referring to FIG. 5, there is shown a receiver 502, a conjugate scrambling code block 504, a plurality of Walsh code blocks 506, 508, and 510, and a plurality of accumulators 512, 514, and 516. The receiver 502 may comprise at least a portion of the functionality of the receiver 284, RF front end 280, and antenna 276. The processor 282 (FIG. 2) may comprise at least a portion of the functionality of the conjugate scrambling code block 504, at least a portion of the functionality of the Walsh code blocks 506, 508, and 510, and at least a portion of the functionality of the accumulators 512, 514, and 516.

The receiver 502 may receive scrambling code encoded data from a plurality of RF channels 112a, 114a, and 116a, for example. RF channel 112a may contain encoded data transmitted for a user #1. The user #1 may utilize a mobile terminal 102. RF channel 114a may contain encoded data transmitted for a user #2. The user #2 may utilize a mobile terminal 104. RF channel 116a may contain encoded data transmitted for a user #3. The user #3 may utilize a mobile terminal 106. The receiver may output a signal RX(n) as defined in equation [9], for example.

The conjugate scrambling code block 504 may decode received scrambling code encoded data from the plurality of RF channels 112a, 114a, and 116a, for example by utilizing a descrambling code. The descrambling code may be based on scrambling codes utilized at the base station 120, for example. The descrambling code may be a conjugate version of the scrambling codes. The decoded data may be represented by the term (conj(C(n))·RX(n)) in equation [17], for example.

The Walsh code block 506 may despread the decoded data to compute estimates of received data bits transmitted for user #1 via the RF channel 112a. The data bits may be represented by $\hat{D}_m(k)$ and computed as defined in equation [17] for user #1 corresponding to m=0 based on a Walsh code $W_1$, and a spreading factor SF, for example. The Walsh code block 508 may despread the decoded data to compute estimates of received data bits transmitted for user #2 via the RF channel 114a. The data bits may be represented by $\hat{D}_m(k)$ and computed as defined in equation [17] for user #2 corresponding to m=1 based on a Walsh code $W_2$, and the spreading factor SF, for example. The Walsh code block 508 may despread the decoded data to compute estimates of received data bits transmitted for user #3 via the RF channel 116a. The data bits may be represented by $\hat{D}_m(k)$ and computed as defined in equation [17] for user #3 corresponding to m=2 based on a Walsh code $W_3$, and the spreading factor SF, for example.

The accumulator 512 may detect the received data bits transmitted for user #1 by detecting energy levels when the decoded data is despread utilizing the Walsh code $W_1$. Due to the orthogonality property of Walsh codes, as described in equation [4], when a signal received from RF channels 114a and/or 116a is despread utilizing the Walsh code $W_1$, the detected energy at the accumulator 512 may be approximately equal to 0, for example. The output from the accumulator 512 may be the detected data bits $\hat{D}_m(k)$ for user #1 corresponding to m=0. The accumulator 514 may detect the received data bits transmitted for user #2 by detecting energy levels when the decoded data is despread utilizing the Walsh code $W_2$. The output from the accumulator 514 may be the detected data bits $\hat{D}_m(k)$ for user #2 corresponding to m=1. The accumulator 516 may detect the received data bits transmitted for user #3 by detecting energy levels when the decoded data is despread utilizing the Walsh code $W_3$. The output from the accumulator 516 may be the detected data bits $\hat{D}_m(k)$ for user #3 corresponding to m=2.

Figure 6:
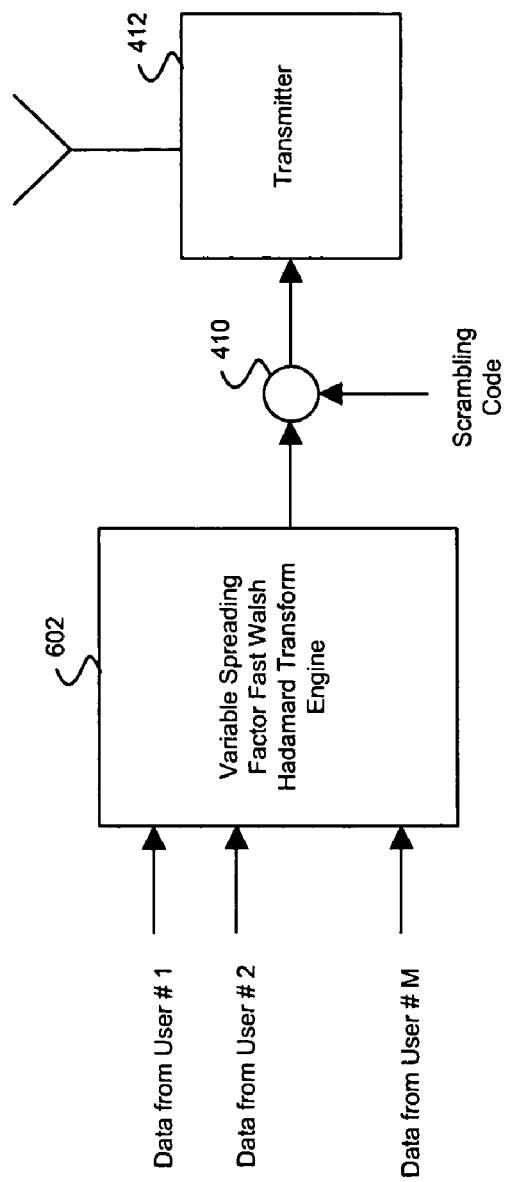
FIG. 6 is an exemplary block diagram illustrating a WCDMA downlink multi-user transmitter utilizing a Fast Walsh Hadamard Transform engine, in accordance with an embodiment of the invention.

FIG. 6 is an exemplary block diagram illustrating a WCDMA downlink multi-user transmitter utilizing a Fast Walsh Hadamard Transform engine, in accordance with an embodiment of the invention. FIG. 6 may illustrate an exemplary implementation of a multi-user transmitter 306, in accordance with an embodiment of the invention. Referring to FIG. 6, there is shown a variable spreading factor Fast Walsh Hadamard Transform engine 602, a scrambling code block 410, and a transmitter 412. The scrambling block 410 and transmitter 412 may be substantially as described in FIG. 4. The variable spreading factor Fast Walsh Hadamard Transform engine 602 may comprise functionality contained in the plurality of Walsh code blocks 402, 404, and 406, the summing block 408.

In various embodiments of the invention, the variable spreading factor Fast Walsh Hadamard Transform engine 602 may receive input data to be transmitted to user #1 via an RF channel 112a, input data to be transmitted to user #2 via an RF channel 114a, and input data to be transmitted to user #3 via an RF channel 116a. The user #1 may utilize a mobile terminal 102, the user #2 may utilize a mobile terminal 104, and the user #3 may utilize a mobile terminal 106. The variable spreading factor Fast Walsh Hadamard Transform engine 602 may utilize equation [8] to compute a group of chips based on data to be transmitted to the user #1 corresponding to user m=0 based on a Walsh code $W_1$, and a spreading factor, $SF_1$, for example. The variable spreading factor Fast Walsh Hadamard Transform engine 602 may utilize equation [8] to compute a group of chips based on data to be transmitted to the user #2 corresponding to user m=2 based on a Walsh code $W_2$, and a spreading factor, $SF_2$, for example. The variable spreading factor Fast Walsh Hadamard Transform engine 602 may utilize equation [8] to compute a group of chips based on data to be transmitted to the user #3 corresponding to user m=2 based on a Walsh code $W_3$, and a spreading factor, $SF_3$, for example. The variable spreading factor Fast Walsh Hadamard Transform engine 602 may generate a transmitted data vector $D_{IN}$ based on the plurality of groups of chips computed by the corresponding to the number of users M=3, for example.

In various embodiments of the invention, the value for the spreading factor $SF_1$ may be different from the values for at least one of the remaining spreading factors $SF_2$ and $SF_3$. Similarly, the value for the spreading factor $SF_2$ may be different from the values for at least one of the remaining spreading factors $SF_1$ and $SF_3$. Furthermore, the value for the spreading factor $SF_3$ may be different from the values for at least one of the remaining spreading factors $SF_1$ and $SF_2$.

Figure 7:
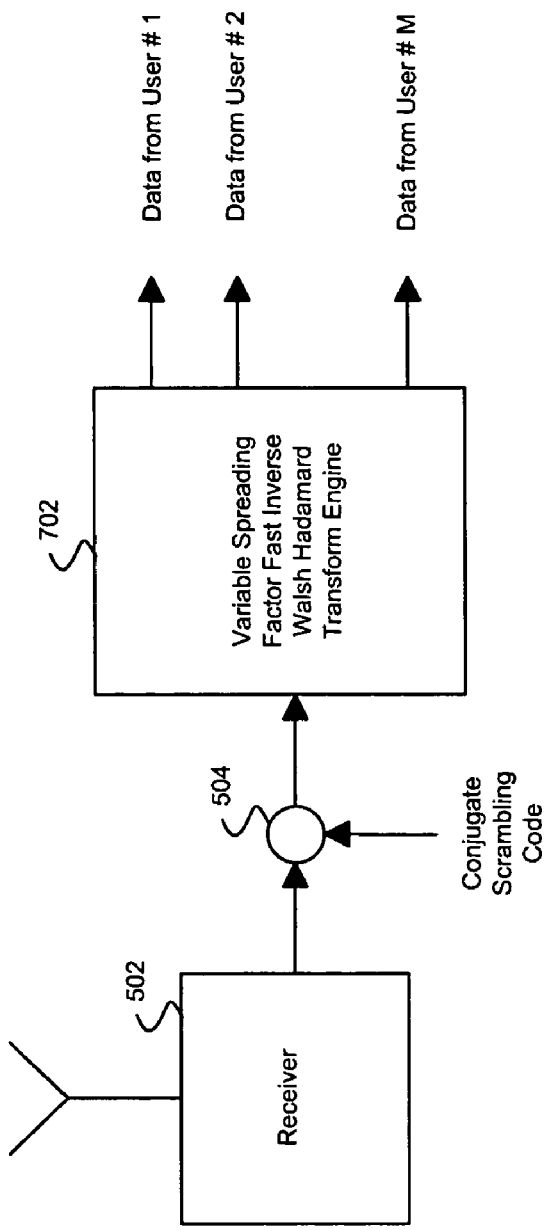
FIG. 7 is an exemplary block diagram illustrating a WCDMA downlink multi-user receiver utilizing an inverse Fast Walsh Hadamard Transform engine, in accordance with an embodiment of the invention.

FIG. 7 is an exemplary block diagram illustrating a WCDMA downlink multi-user receiver utilizing an inverse Fast Walsh Hadamard Transform engine, in accordance with an embodiment of the invention. FIG. 7 may illustrate an exemplary implementation of a multi-user receiver 310, in accordance with an embodiment of the invention. Referring to FIG. 7, there is shown a receiver 502, a conjugate scrambling code block 504, and a variable spreading factor inverse Fast Walsh Hadamard Transform engine 702. The receiver 502 and conjugate scrambling code block 504 may be substantially as described in FIG. 5. The variable spreading factor inverse Fast Walsh Hadamard Transform engine 602 may comprise functionality contained in the plurality of Walsh code blocks 506, 508, and 510, and a plurality of accumulators 512, 514, and 516.

In various embodiments of the invention, the variable spreading factor inverse Fast Walsh Hadamard Transform engine 702 may receive despread decoded data to compute estimates of data bits received at a mobile terminal that were transmitted by the base station 120 via the RF channel 112a, data bits transmitted by the base station 120 via the RF channel 114a, and data bits transmitted by the base station 120 via the RF channel 116a, for example. The data bits received by user #1 may be represented by $\hat{D}_m(k)$ and computed as defined in equation [17] corresponding to m=0 based on a Walsh code $W_1$, and a spreading factor $SF_1$, for example. The data bits received by user #2 may be represented by $\hat{D}_m(k)$ and computed as defined in equation [17] corresponding to m=1 based on a Walsh code $W_2$, and a spreading factor $SF_2$, for example. The data bits received by user #3 may be represented by $\hat{D}_m(k)$ and computed as defined in equation [17] corresponding to m=2 based on a Walsh code $W_3$, and a spreading factor $SF_3$, for example.

The variable spreading factor inverse Fast Walsh Hadamard Transform engine 702 may detect the received data bits received by user #1 at mobile terminal 102 by detecting energy levels when the decoded data is despread utilizing the Walsh code $W_1$, and a spreading factor $SF_1$. The variable spreading factor inverse Fast Walsh Hadamard Transform engine 702 may detect the received data bits received by user #2 at mobile terminal 104 by detecting energy levels when the decoded data is despread utilizing the Walsh code $W_2$, and a spreading factor $SF_2$. The variable spreading factor inverse Fast Walsh Hadamard Transform engine 702 may detect the received data bits received by user #3 at mobile terminal 106 by detecting energy levels when the decoded data is despread utilizing the Walsh code $W_3$, and a spreading factor $SF_3$. Due to the orthogonality property of Walsh codes, as described in equation [4], when a signal received from RF channels 114*a* and/or 116*a* is despread utilizing the Walsh code $W_1$, the detected energy at the variable spreading factor inverse Fast Walsh Hadamard Transform engine 702 may be approximately equal to 0, for example. The output from the variable spreading factor inverse Fast Walsh Hadamard Transform engine 702 may be the detected data bits $\hat{D}_m(k)$ for user #1 corresponding to m=0, for user #2 corresponding to m=1, and for user #3 corresponding to m=2, for example.

In various embodiments of the invention, the value for the spreading factor $SF_1$ may be different from the values for at least one of the remaining spreading factors $SF_2$ and $SF_3$. Similarly, the value for the spreading factor $SF_2$ may be different from the values for at least one of the remaining spreading factors $SF_1$ and $SF_3$. Furthermore, the value for the spreading factor $SF_3$ may be different from the values for at least one of the remaining spreading factors $SF_1$ and $SF_2$.

In various embodiments of the invention, the expression in equation [8] may be represented as a matrix multiplication as in the following equation, for example:

$$Y = W_N \times X \quad \text{Equation [18]}$$

where $W_N$ may represent an N×N square matrix comprising Walsh codes, X may represent an N×1 input vector comprising data to be transmitted to a plurality of M users, and Y may represent an N×1 data vector. N=256, and M may equal the number of users. At least a portion of data from the vector X may be transmitted to each of the M users.

When the spreading factor associated with the Walsh code is equal to the length of the input vector X, a Walsh transform may be computed by defining a (2·L)×(2·L) square matrix $W_{2 \cdot L}$ comprising a plurality of L×L submatrices $W_L$ as in the following equation, for example:

$$W_{2L} = \begin{bmatrix} W_L & W_L \\ W_L & -W_L \end{bmatrix} \quad \text{Equation [19a]}$$

Similarly, a (2·L)×1 input vector X may be defined comprising a plurality of L×1 subvectors as in the following equation, for example:

$$X = \begin{bmatrix} X_1 \\ X_2 \end{bmatrix} \quad \text{Equation [19b]}$$

and a (2·L)×1 data vector Y may be defined comprising a plurality of L×1 subvectors as in the following equation, for example:

$$Y = \begin{bmatrix} Y_1 \\ Y_2 \end{bmatrix} \quad \text{Equation [19c]}$$

where L may represent a length of a subvector $X_1$, $X_2$, $Y_1$, and/or $Y_2$, for example. The single element submatrix $W_1$=1, for L=1.

Based on equations [19a], [19b], and [19c], equation [18] may be represented as in the following equations:

$$\begin{bmatrix} Y_1 \\ Y_2 \end{bmatrix} = \begin{bmatrix} W_L & W_L \\ W_L & -W_L \end{bmatrix} \cdot \begin{bmatrix} X_1 \\ X_2 \end{bmatrix} \quad \text{Equation [20a]}$$

$$\begin{bmatrix} Y_1 \\ Y_2 \end{bmatrix} = \begin{bmatrix} W_L \cdot X_1 + W_L \cdot X_2 \\ W_L \cdot X_1 = W_L \cdot X_2 \end{bmatrix} \quad \text{Equation [20b]}$$

When the spreading factor associated with the Walsh code is less than the length of the input vector X, a Walsh transform may be computed by defining a (2·L)×(2·L) diagonal matrix $W_{2 \cdot L}$ comprising a plurality of L×L submatrices $W_L$ as in the following equation, for example:

$$W_{2L} = \begin{bmatrix} W_L & 0 \\ 0 & -W_L \end{bmatrix} \quad \text{Equation [21]}$$

Starting from a value L=1, the method of equations [19a], [21], [19b], and/or [19c] may be iteratively practiced to compute an equivalent result to an N×N square matrix, an N×1 input vector, and N×1 data vector when L=N/2. For example, equations [20a], and [20b] may be utilized to compute a Fast Walsh Transform according to equation [8].

Various embodiments of the invention may comprise a method for representing a Fast Walsh Transform equation, as in equation [8], as a matrix multiplication, as in equation [18]. The matrices in equation [18] may be iteratively decomposed and represented as comprising a plurality of submatrices, as in equations [19a], [21]. [19b], and/or [19c]. In various embodiments of the invention, the iterative decomposition may enable the Fast Walsh Transform to be computed by performing a series of butterfly calculations in a Fast Walsh Hadamard Transform engine 602.

Figure 8A:
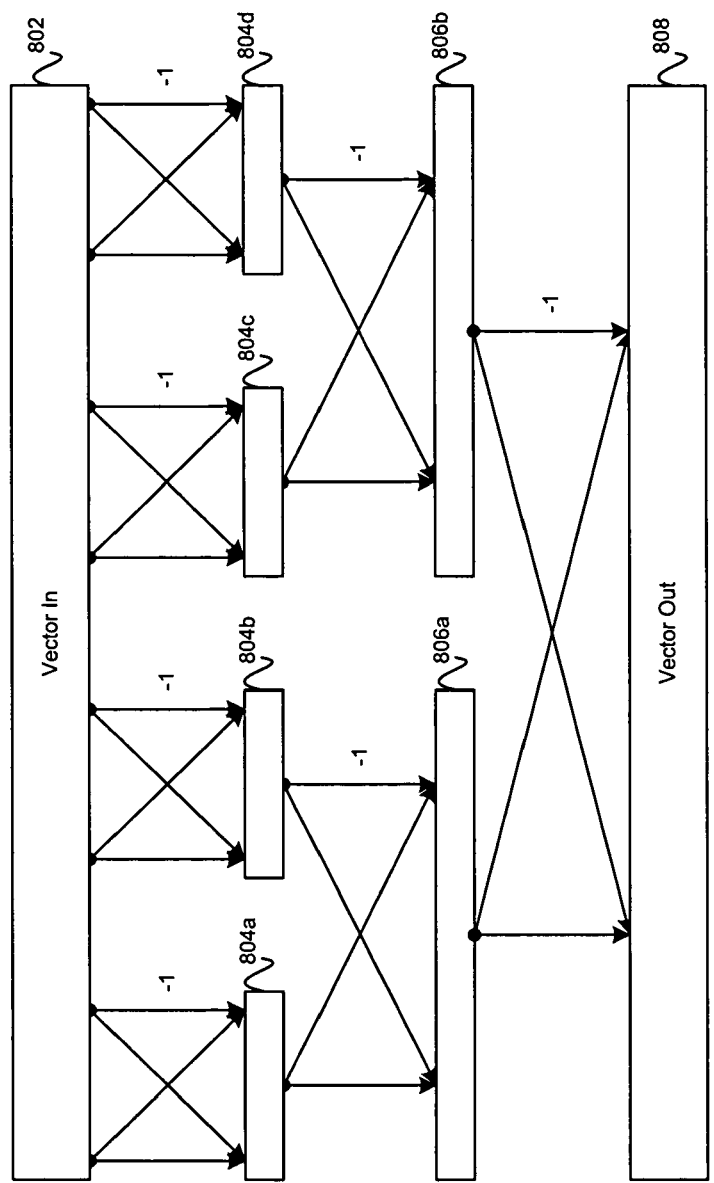
FIG. 8A is a diagram illustrating an exemplary butterfly calculation for a Fast Walsh Transform where the spreading factor is equal to the data vector length, in accordance with an embodiment of the invention.

FIG. 8A is a diagram illustrating an exemplary butterfly calculation for a Fast Walsh Transform where the spreading factor is equal to the data vector length, in accordance with an embodiment of the invention. The input vector length in the exemplary FIG. 8A is 8 bits. The spreading factor associated with the Walsh code in the exemplary FIG. 8A is also 8. The data vector length in the exemplary FIG. 8A is 8 chips. Referring to FIG. 8A, there is shown an input vector 802, a data vector 808, a plurality of first intermediate results 804*a*, 804*b*, 804*c*, and 804*d*, and a plurality of second intermediate results 806*a*, and 806*b*.

The input vector 802 may represent an input vector X in equation [18]. The data vector 808 may represent the data vector Y in equation [18]. The bits contained in the input vector 802, and the Walsh code matrix $W_N$ in equation [18], may be subdivided in connection with the butterfly calculation method. For a data vector 808 of length 8 bits, the Fast Walsh Transform may be computed in $\log_2 8$, or 3, iterations of the butterfly method. In a first iteration, for an input vector 802 of length 8 bits, 8/2, or 4, first intermediate results 804*a*, 804*b*, 804*c*, and 804*d*, may be computed utilizing a corresponding 2 bits from the input vector 802. Each of the first intermediate results 804*a*, 804*b*, 804*c*, and 804*d*, may be computed by utilizing a Walsh code square submatrix for L=1, as in the following equation for example:

$$W_2 = \begin{bmatrix} 1 & 1 \\ 1 & -1 \end{bmatrix} \quad \text{Equation [22]}$$

In a second iteration 4/2, or 2, second intermediate results 806a, and 806b, may be computed utilizing the first intermediate results 804a, 804b, 804c, and 804d. The second intermediate result 806a may be computed utilizing the first intermediate results 804a, and 804b. The second intermediate result 806b may be computed utilizing the first intermediate results 804c, and 804d. Each of the second intermediate results 806a, and 806b, may be computed by utilizing a Walsh code submatrix, as in Equation [22], to compute a Walsh code submatrix for L=2, as in the following equation, for example:

$$W_4 = \begin{bmatrix} 1 & 1 & 1 & 1 \\ 1 & -1 & 1 & -1 \\ 1 & 1 & -1 & -1 \\ 1 & -1 & -1 & 1 \end{bmatrix} \quad \text{Equation [23]}$$

In a third iteration the data vector 808 may be computed utilizing the second intermediate results 806a, and 806b. The data vector 808, may be computed by utilizing a Walsh code submatrix, as in Equation [22], to compute a Walsh code matrix for L=4, as in the following equation, for example:

$$W_8 = \begin{bmatrix} 1 & 1 & 1 & 1 & 1 & 1 & 1 & 1 \\ 1 & -1 & 1 & -1 & 1 & -1 & 1 & -1 \\ 1 & 1 & -1 & -1 & 1 & 1 & -1 & -1 \\ 1 & -1 & -1 & 1 & 1 & -1 & -1 & 1 \\ 1 & 1 & 1 & 1 & -1 & -1 & -1 & -1 \\ 1 & -1 & 1 & -1 & -1 & 1 & -1 & 1 \\ 1 & 1 & -1 & -1 & -1 & -1 & 1 & 1 \\ 1 & -1 & -1 & 1 & -1 & 1 & 1 & -1 \end{bmatrix} \quad \text{Equation [24]}$$

Figure 8B:
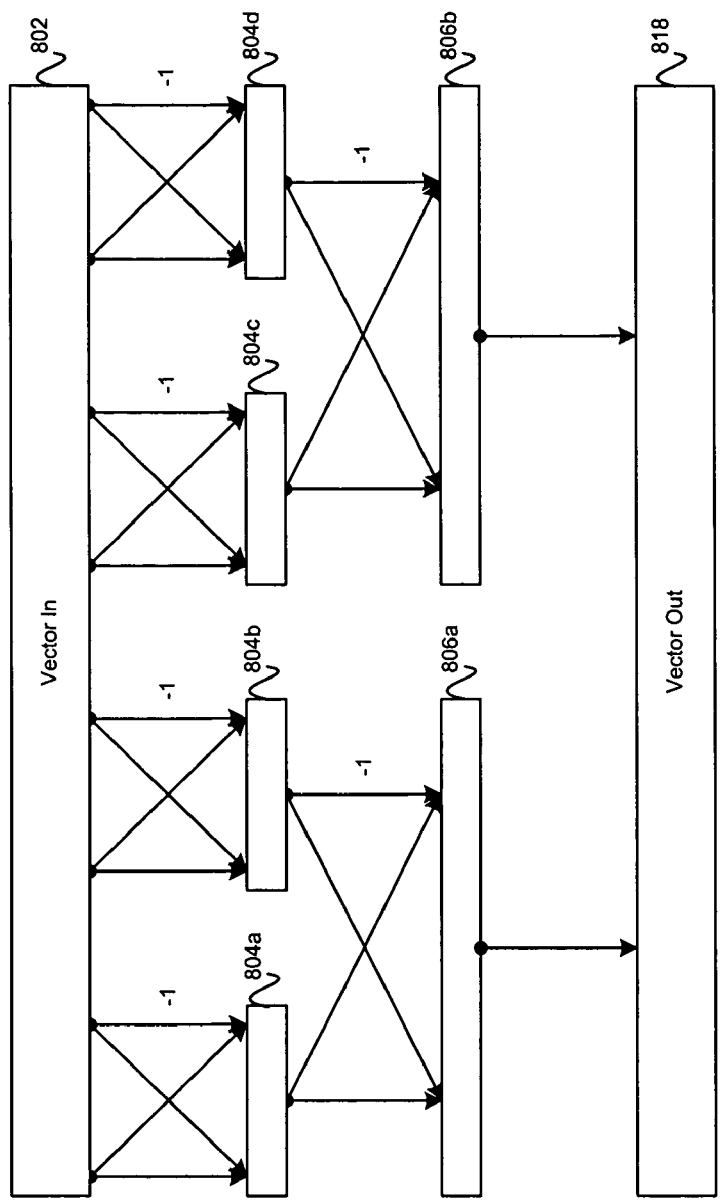
FIG. 8B is a diagram illustrating an exemplary butterfly calculation for a Fast Walsh Transform where the spreading factor is less than the data vector length, in accordance with an embodiment of the invention.

FIG. 8B is a diagram illustrating an exemplary butterfly calculation for a Fast Walsh Transform where the spreading factor is less than the data vector length, in accordance with an embodiment of the invention. The input vector length in the exemplary FIG. 8B is 8 bits. The spreading factor associated with the Walsh code in the exemplary FIG. 8B is 4. The data vector length in the exemplary FIG. 8B is 8 chips. Referring to FIG. 8B, there is shown an input vector 802, a data vector 818, a plurality of first intermediate results 804a, 804b, 804c, and 804d, and a plurality of second intermediate results 806a, and 806b. The input vector 802, first intermediate results 804a, 804b, 804c, and 804d, and second intermediate results 806a, and 806b may be substantially as described for FIG. 8A.

In a third iteration the data vector 818 may be computed utilizing the second intermediate results 806a, and 804b. The data vector 818, may be computed by utilizing a Walsh code diagonal submatrix, as in the following equation:

$$W_2 = \begin{bmatrix} 1 & 0 \\ 0 & 1 \end{bmatrix} \quad \text{Equation [25a]}$$

to compute a Walsh code matrix for L=4, as in the following equation, for example:

$$W_8 = \begin{bmatrix} 1 & 1 & 1 & 1 & 0 & 0 & 0 & 0 \\ 1 & -1 & 1 & -1 & 0 & 0 & 0 & 0 \\ 1 & 1 & -1 & -1 & 0 & 0 & 0 & 0 \\ 1 & -1 & -1 & 1 & 0 & 0 & 0 & 0 \\ 0 & 0 & 0 & 0 & 1 & 1 & 1 & 1 \\ 0 & 0 & 0 & 0 & 1 & -1 & 1 & -1 \\ 0 & 0 & 0 & 0 & 1 & 1 & -1 & -1 \\ 0 & 0 & 0 & 0 & 1 & -1 & -1 & 1 \end{bmatrix} \quad \text{Equation [25b]}$$

Figure 8C:
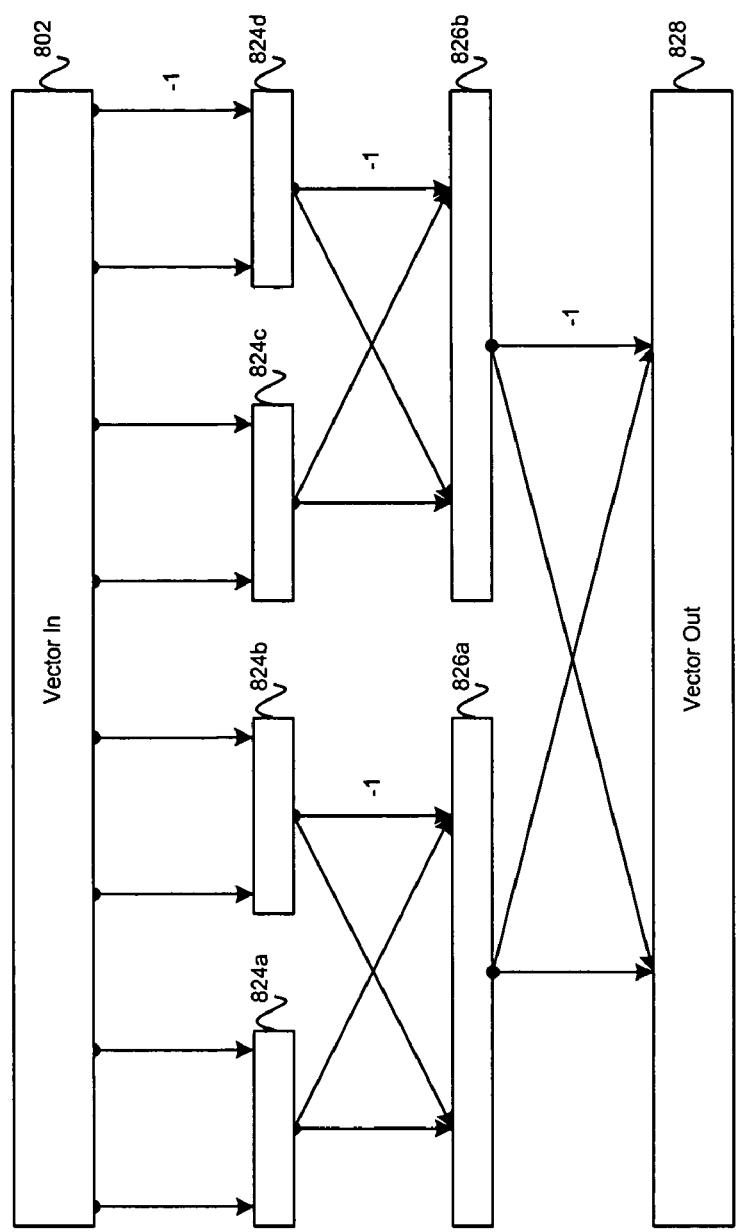
FIG. 8C is a diagram illustrating another exemplary butterfly calculation for a Fast Walsh Transform where the spreading factor is equal to the data vector length, in accordance with an embodiment of the invention.

FIG. 8C is a diagram illustrating another exemplary butterfly calculation for a Fast Walsh Transform where the spreading factor is equal to the data vector length, in accordance with an embodiment of the invention. The input vector length in the exemplary FIG. 8C is 8 bits. The spreading factor associated with the Walsh code in the exemplary FIG. 8C is also 8. The data vector length in the exemplary FIG. 8C is 8 chips. Referring to FIG. 8C, there is shown an input vector 802, a data vector 828, a plurality of first intermediate results 824a, 824b, 824c, and 824d, and a plurality of second intermediate results 826a, and 826b. The input vector 802 may be substantially as described in FIG. 8A.

In a first iteration, first intermediate results 824a, 824b, 824c, and 824d, may be computed utilizing a corresponding 2 bits from the input vector 802. Each of the first intermediate results 824a, 824b, 824c, and 824d, may be computed by utilizing a Walsh code submatrix for L=1, as in equation [25a], for example.

In a second iteration, second intermediate results 826a, and 826b, may be computed utilizing the first intermediate results 824a, 824b, 824c, and 824d. The second intermediate result 826a may be computed utilizing the first intermediate results 824a, and 824b. The second intermediate result 826b may be computed utilizing the first intermediate results 824c, and 824d. Each of the second intermediate results 826a, and 826b, may be computed by utilizing a Walsh code submatrix, as in Equation [22], to compute a Walsh code submatrix for L=2, as in the following equation, for example:

$$W_4 = \begin{bmatrix} 1 & 0 & 1 & 0 \\ 0 & 1 & 0 & 1 \\ 1 & 0 & -1 & 0 \\ 0 & 1 & 0 & -1 \end{bmatrix} \quad \text{Equation [27]}$$

In a third iteration the data vector 828 may be computed utilizing the second intermediate results 826a, and 826b. The data vector 828, may be computed by utilizing a Walsh code submatrix, as in Equation [22], to compute a Walsh code matrix for L=4, as in the following equation, for example:

$$W_8 = \begin{bmatrix} 1 & 0 & 1 & 0 & 1 & 0 & 1 & 0 \\ 0 & 1 & 0 & 1 & 0 & 1 & 0 & 1 \\ 1 & 0 & -1 & 0 & 1 & 0 & -1 & 0 \\ 0 & 1 & 0 & -1 & 0 & 1 & 0 & -1 \\ 1 & 0 & 1 & 0 & -1 & 1 & -1 & 0 \\ 0 & 1 & 0 & 1 & 0 & -1 & 0 & -1 \\ 1 & 0 & -1 & 0 & -1 & 0 & 1 & 0 \\ 0 & 1 & 0 & -1 & 0 & -1 & 0 & 1 \end{bmatrix} \quad \text{Equation [28]}$$

Figure 8D:
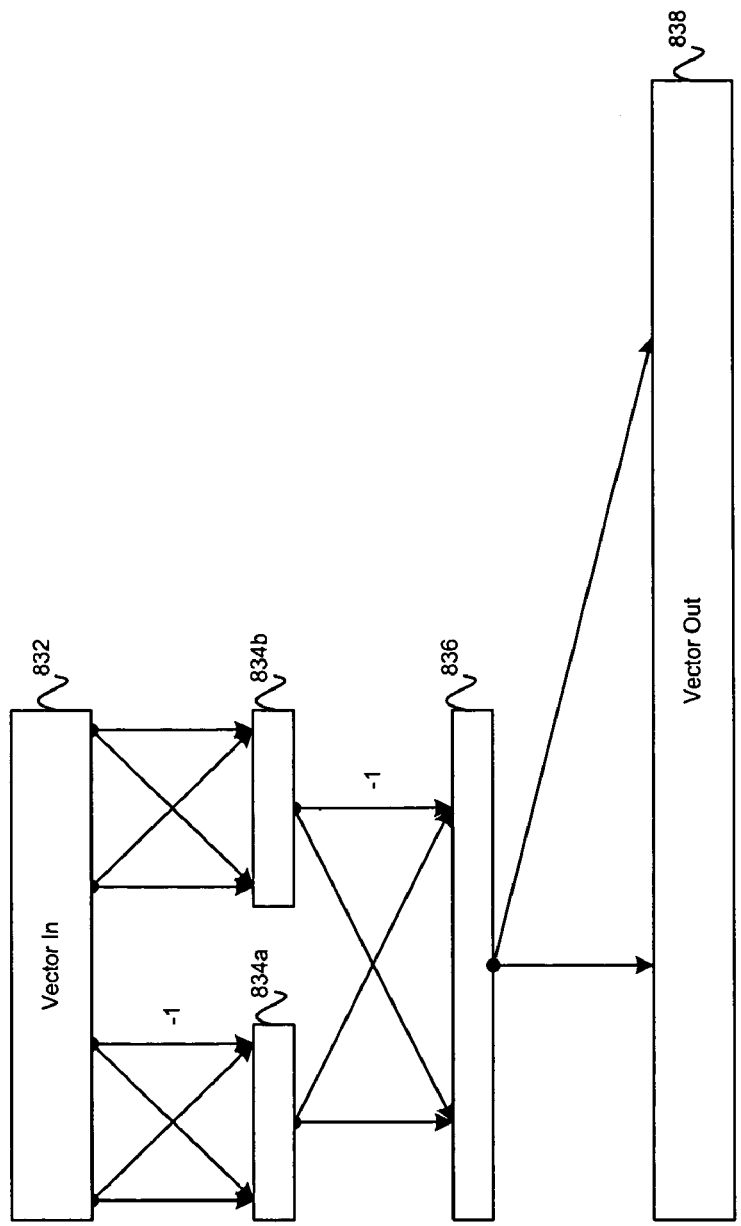
FIG. 8D is a diagram illustrating an exemplary butterfly calculation for a Fast Walsh Transform where the input vector length is less than the data vector length, in accordance with an embodiment of the invention.

FIG. 8D is a diagram illustrating an exemplary butterfly calculation for a Fast Walsh Transform where the input vector length is less than the data vector length, in accordance with an embodiment of the invention. The input vector length in the exemplary FIG. 8D is 4 bits. The spreading factor associated with the Walsh code in the exemplary FIG. 8D is 8. The data vector length in the exemplary FIG. 8D is 8 chips. Referring to FIG. 8D, there is shown an input vector 832, a data vector 838, a plurality of first intermediate results 834a, and 834b, and a second intermediate result 836.

The input vector 832 may represent an input vector X in equation [18]. The data vector 838 may represent the data vector Y in equation [18]. The bits contained in the input vector 832, and the Walsh code matrix $W_N$ in equation [18], may be subdivided in connection with the butterfly calculation method. For a data vector 838 of length 8 bits, the Fast Walsh Transform may be computed in $\log_2 8$, or 3, iterations of the butterfly method. In a first iteration, for an input vector 832 of length 4 bits, 4/2, or 2, first intermediate results 834a, and 834b, may be computed utilizing a corresponding 2 bits from the input vector 832. Each of the first intermediate results 834a, and 834b, may be computed by utilizing a Walsh code submatrix for L=1, as in equation [22] for example.

In a second iteration 2/2, or 1, second intermediate result 836 may be computed utilizing the first intermediate results 834a, and 834b. The second intermediate result 836 may be computed by utilizing a Walsh code submatrix for L=2, as in equation [23].

In a third iteration the data vector 838 may be computed utilizing the second intermediate results 836. The data vector 838, may be computed by utilizing a Walsh code vector, as in the following equation:

$$W_2 = \begin{bmatrix} 1 \\ 1 \end{bmatrix} \quad \text{Equation [29a]}$$

to compute a Walsh code rectangular matrix for L=4, as in the following equation:

$$W_8 = \begin{bmatrix} 1 & 1 & 1 & 1 \\ 1 & -1 & 1 & -1 \\ 1 & 1 & -1 & -1 \\ 1 & -1 & -1 & 1 \\ 1 & 1 & 1 & 1 \\ 1 & -1 & 1 & -1 \\ 1 & 1 & -1 & -1 \\ 1 & -1 & -1 & 1 \end{bmatrix} \quad \text{Equation [29b]}$$

Figure 8E:
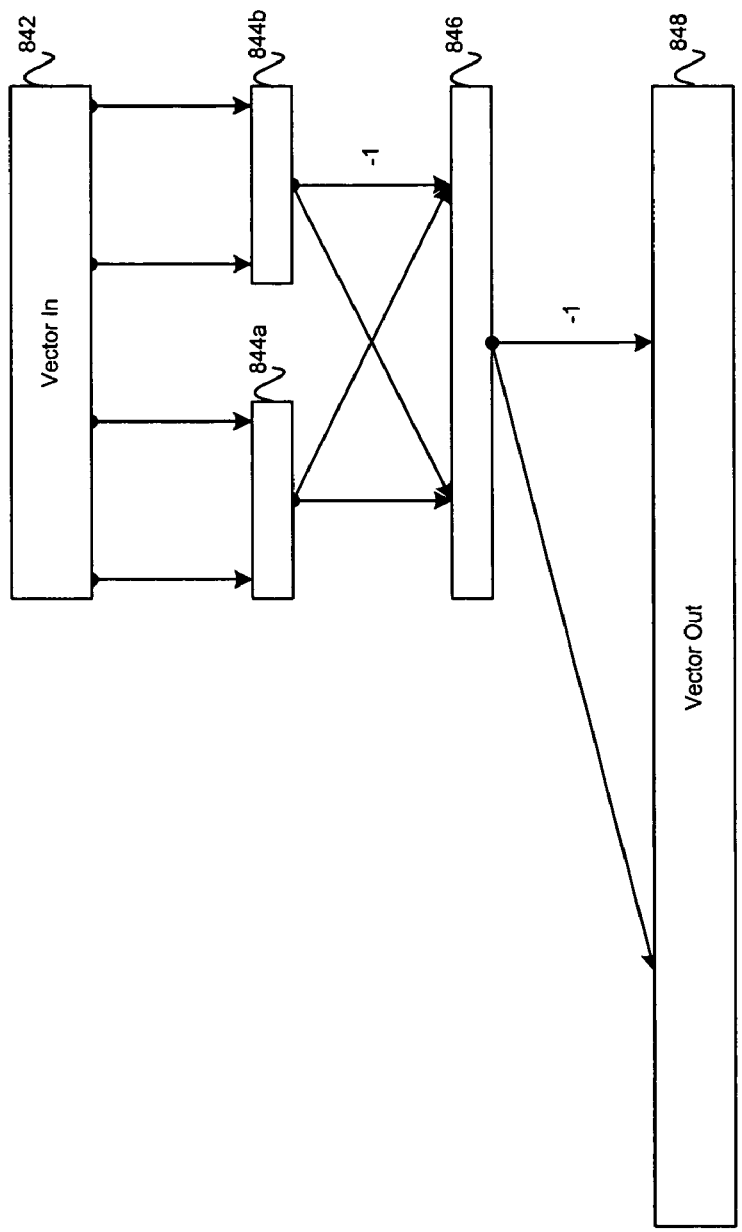
FIG. 8E is a diagram illustrating an exemplary butterfly calculation for a Fast Walsh Transform where the input vector length, and the spreading factor, are less than the data vector length, in accordance with an embodiment of the invention.

FIG. 8E is a diagram illustrating an exemplary butterfly calculation for a Fast Walsh Transform where the input vector length, and the spreading factor, are less than the data vector length, in accordance with an embodiment of the invention. The input vector length in the exemplary FIG. 8E is 4 bits. The spreading factor associated with the Walsh code in the exemplary FIG. 8E is 4. The data vector length in the exemplary FIG. 8E is 8 chips. Referring to FIG. 8E, there is shown an input vector 842, a data vector 848, a plurality of first intermediate results 844a, and 844b, and a second intermediate result 846.

The input vector 842 may represent an input vector X in equation [18]. The data vector 848 may represent the data vector Y in equation [18]. The bits contained in the input vector 842, and the Walsh code matrix $W_N$ in equation [18], may be subdivided in connection with the butterfly calculation method. For a data vector 848 of length 8 bits, the Fast Walsh Transform may be computed in $\log_2 8$, or 3, iterations of the butterfly method. In a first iteration, for an input vector 842 of length 4 bits, 4/2, or 2, first intermediate results 844a, and 844b, may be computed utilizing a corresponding 2 bits from the input vector 842. Each of the first intermediate results 844a, and 844b, may be computed by utilizing a Walsh code submatrix for L=1, as in equation [25a] for example.

In a second iteration 2/2, or 1, second intermediate result 846 may be computed utilizing the first intermediate results 844a, and 844b. The second intermediate result 846 may be computed by utilizing a Walsh code submatrix, as in Equation [22], to compute a Walsh code submatrix for L=2 as in equation [27].

In a third iteration the data vector 848 may be computed utilizing the second intermediate results 846. The data vector 848, may be computed by utilizing a Walsh code vector, as in the following equation:

$$W_2 = \begin{bmatrix} 1 \\ -1 \end{bmatrix} \quad \text{Equation [30a]}$$

to compute a Walsh code rectangular matrix for L=4 as in the following equation:

$$W_8 = \begin{bmatrix} 1 & 0 & 1 & 0 \\ 0 & 1 & 0 & 1 \\ 1 & 0 & -1 & 0 \\ 0 & 1 & 0 & -1 \\ -1 & 0 & -1 & 0 \\ 0 & -1 & 0 & -1 \\ -1 & 0 & 1 & 0 \\ 0 & -1 & 0 & 1 \end{bmatrix} \quad \text{Equation [30b]}$$

Figure 8F:
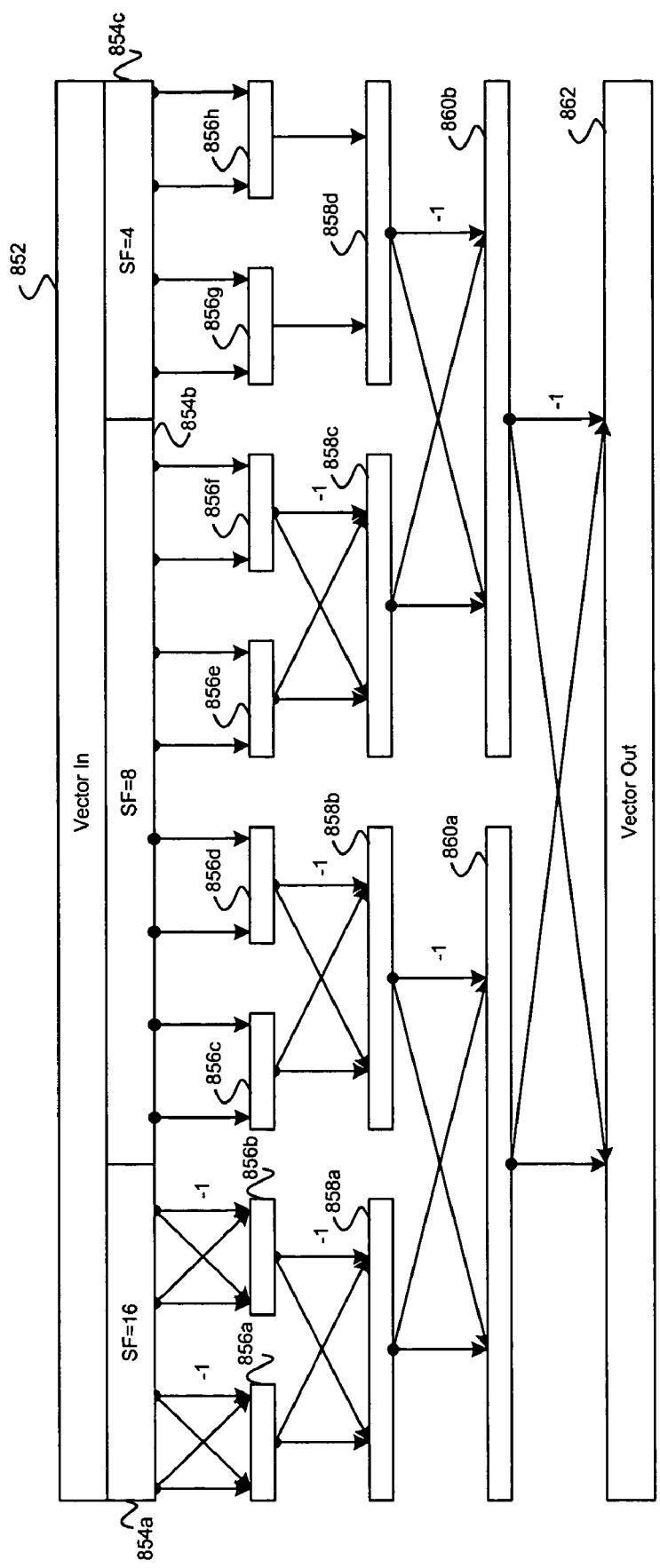
FIG. 8F is a diagram illustrating an exemplary butterfly calculation for a variable spreading factor Fast Walsh Transform, in accordance with an embodiment of the invention.

FIG. 8F is a diagram illustrating an exemplary butterfly calculation for a variable spreading factor Fast Walsh Transform, in accordance with an embodiment of the invention. The input vector length in the exemplary FIG. 8F is 16 bits and may comprise bits from a plurality of users. The data vector length in the exemplary FIG. 8F is 16 chips. Referring to FIG. 8F, there is shown an input vector 852, a data vector 862, a plurality of first intermediate results 856a, 856b, 856c, 856d, 856e, 856f, 856g and 856h, a plurality of second intermediate results 858a, 858b, 858c, and 858d, and a plurality of third intermediate results 860a, and 860b. The input vector 852 may comprise a plurality of subvectors 854a, 854b, and 854c. Each of the subvectors 854a, 854b, and 854c may comprise bits from a corresponding plurality of users. For example, subvector 854a may be associated with user #1, subvector 854b may be associated with user #2, and subvector 854c may be associated with user #3. For a data vector 862 of length 16 bits, the Fast Walsh Transform may be computed in $\log_2 16$, or 4, iterations of the butterfly method.

The subvector 854a may represent a portion of the input vector X in equation [18]. The subvector 854a length in the exemplary FIG. 8F is 4 bits. The spreading factor, $SF_1$, in the exemplary FIG. 8F is 16. The subvector 854b may represent a portion of the input vector X in equation [18]. The subvector 854b length in the exemplary FIG. 8F is 8 bits. The spreading factor, $SF_2$, in the exemplary FIG. 8F is 8. The subvector 854c may represent a portion of the input vector X in equation [18]. The subvector 854*c* length in the exemplary FIG. 8F is 4 bits. The spreading factor, $SF_3$, in the exemplary FIG. 8F is 4.

In a first iteration, for the subvector 854*a* of length 4 bits, 4/2 or 4, first intermediate results 856*a*, and 856*b*, may be computed utilizing a corresponding 2 bits from the subvector 854*a*. In the first iteration, for the subvector 854*b* of length 8 bits, 8/2, or 4 intermediate results 856*c*, 856*d*, 856*e*, and 856*f*, may be computed utilizing a corresponding 2 bits from the subvector 854*b*. In the first iteration, for the subvector 854*c* of length 4 bits, 4/2, or 2 intermediate results 856*g*, and 856*f*, may be computed utilizing a corresponding 2 bits from the subvector 854*c*. Each of the first intermediate results 856*a*, and 856*b* may be computed by utilizing a Walsh code submatrix as in equation [22]. Each of the first intermediate results 856*c*, 856*d*, 856*e*, 856*f*, 856*g*, and 856*h* may be computed by utilizing a Walsh code submatrix as in equation [25a].

In a second iteration, 8/2, or 4 second intermediate results 858*a*, 858*b*, 858*c*, and 858*d*, may be computed utilizing the first intermediate results 856*a*, 856*b*, 856*c*, 856*d*, 856*e*, 856*f*, 856*g*, and 856*h*. The second intermediate result 858*a* may be computed utilizing the first intermediate results 856*a*, and 856*b*. The second intermediate result 858*b* may be computed utilizing the first intermediate results 856*c*, and 856*d*. The second intermediate result 858*c* may be computed utilizing the first intermediate results 856*e*, and 856*f*. The second intermediate result 858*d* may be computed utilizing the first intermediate results 856*g*, and 856*h*. Each of the second intermediate results 858*a*, 858*b*, and 858*c*, may be computed by utilizing a Walsh code submatrix as in equation [22]. The intermediate result 858*d* may be computed by utilizing a Walsh code submatrix as in equation [25a].

In a third iteration, 4/2, or 2, third intermediate results 860*a*, and 860*b*, may be computed utilizing the second intermediate results 858*a*, 858*b*, 858*c*, and 858*d*. The third intermediate result 860*a* may be computed utilizing the second intermediate results 858*a*, and 858*b*. The third intermediate result 860*b* may be computed utilizing the second intermediate results 858*c*, and 858*d*. Each of the third intermediate results 860*a*, and 860*b*, may be computed by utilizing a Walsh code submatrix as in equation [22].

In a fourth iteration the data vector 862 may be computed utilizing the third intermediate results 860*a*, and 860*b*. The data vector 862 may be computed by utilizing a Walsh code submatrix as in equation [22].

Figure 9:
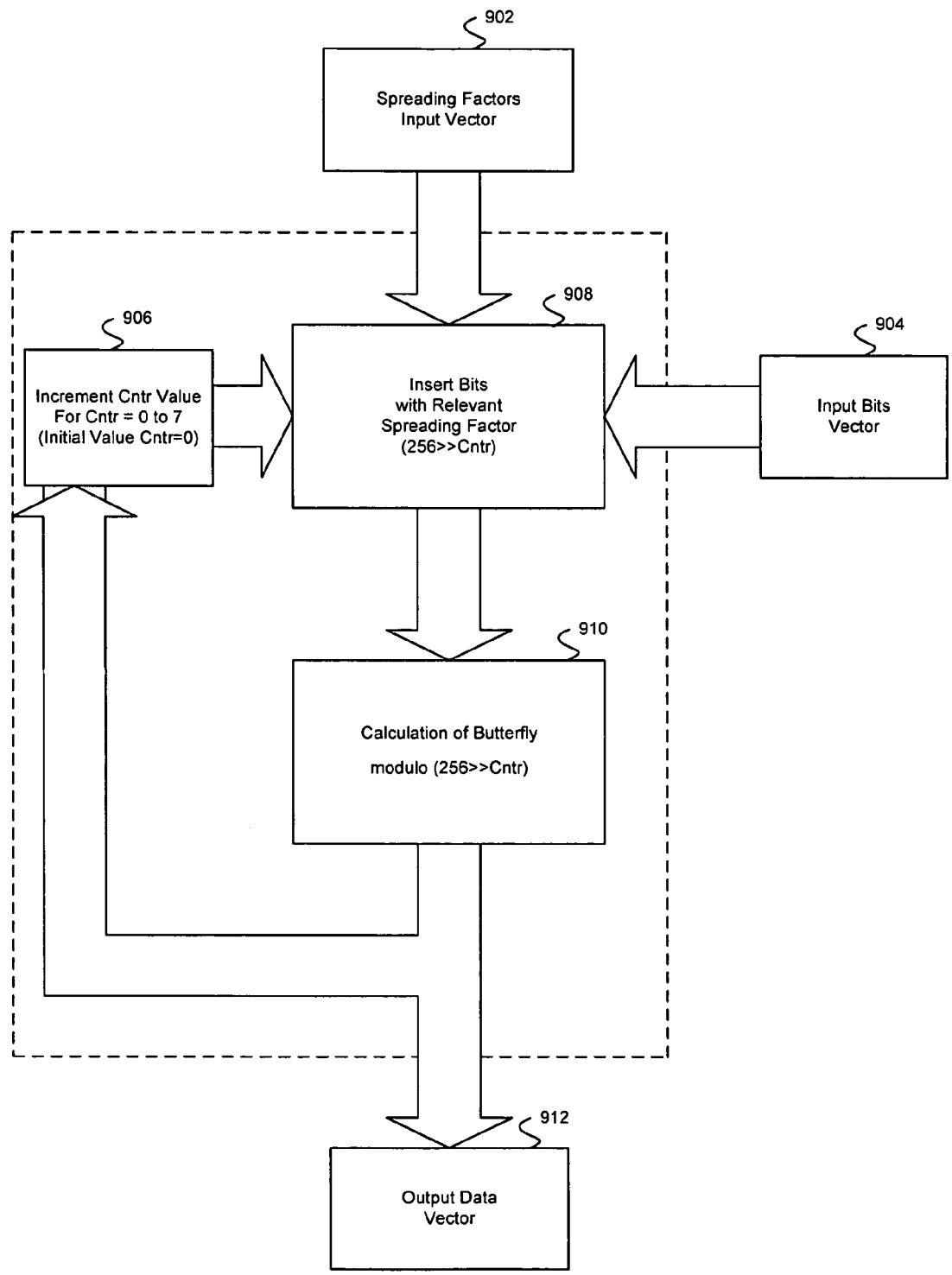
FIG. 9 is a flow chart that illustrates an exemplary computation process utilized by a Fast Walsh Hadamard Transform engine, in accordance with an embodiment of the invention.

FIG. 9 is a flow chart that illustrates an exemplary computation process utilized by a Fast Walsh Hadamard Transform engine, in accordance with an embodiment of the invention. FIG. 9 describes a serial process for computing a Fast Walsh Transform in a variable spreading factor Fast Walsh Hadamard Transform engine 602, in accordance with an embodiment of the invention. Referring to FIG. 9, in step 902, a spreading factors input vector may be generated. The spreading factors input vector may comprise values for spreading factors $SF_m$, corresponding to each user m, where the variable m is an index that may refer to data associated with the corresponding user. In step 904, an input vector may be generated. An exemplary input vector is input vector 852 (FIG. 8F). In step 906, a counter variable, Cntr, may be defined. The counter variable may be utilized to iteratively compute chips, utilizing a method as depicted in equation [8]. Prior to the first iteration, the counter variable may be initialized Cntr=0, for example. For each iteration, the counter variable may be incremented, by 1 for example. In step 906, an upper limit for the value Cntr may be defined, for example Cntr=7. In various embodiments of the invention, the iteration process may end based on the counter value reaching the upper limit value.

In step 908, bits from the input vector, of step 904, may be selected, along with the corresponding spreading factor, selected from the spreading factors input vector, of step 902. In step 910, a butterfly calculation may be performed. In step 912, a data vector may be output. The data vector may be subsequently encoded by a scrambling code block 410 (FIG. 4), and transmitted wirelessly by a transmitter 412. An exemplary data vector is the data vector 862. Following step 910, the counter value may be incremented. A check may be performed to compare the current counter value to the upper limit counter value. Based on the comparison, step 908 may follow step 906.

Figure 10:
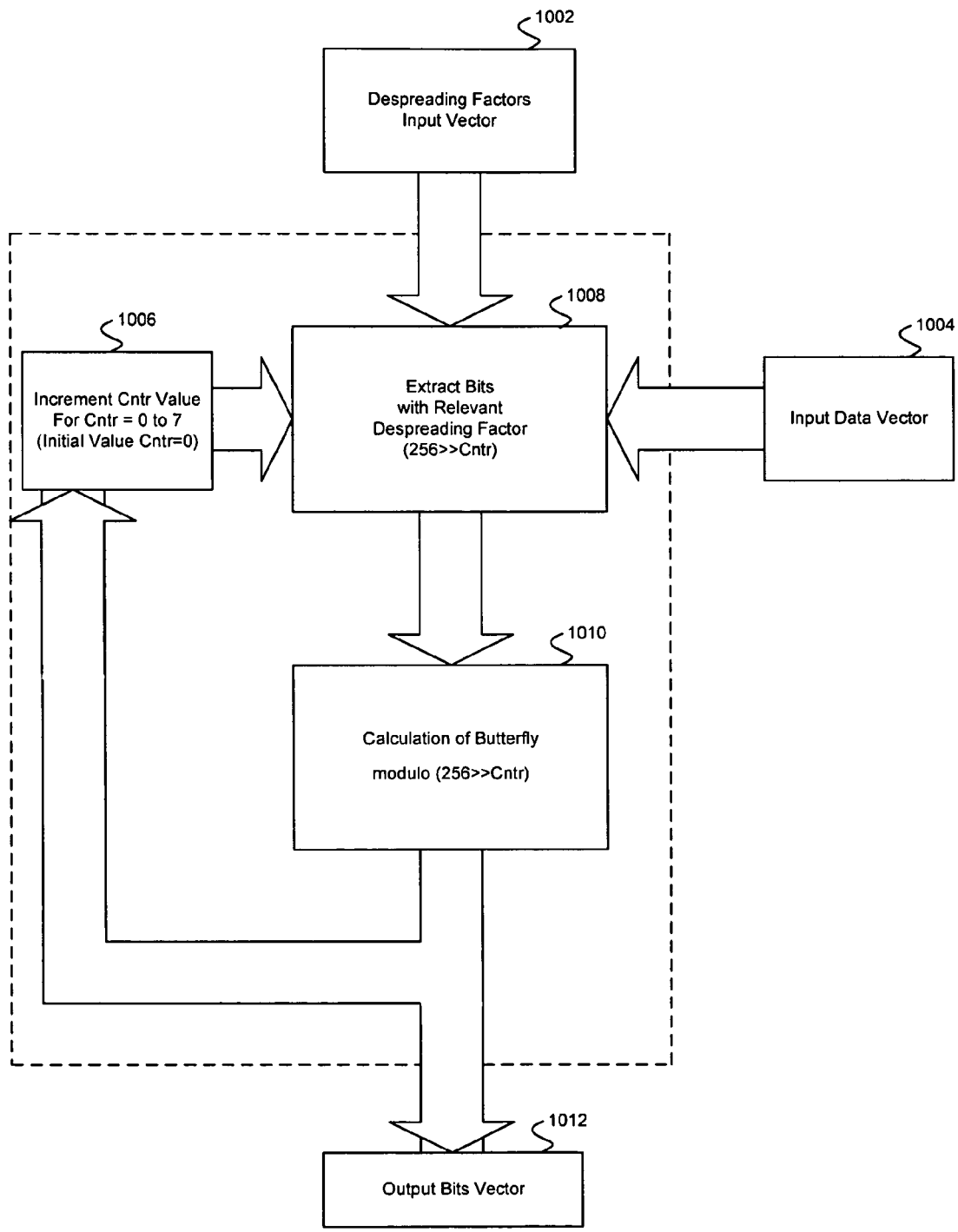
FIG. 10 is a flow chart that illustrates an exemplary computation process utilized by a Fast Walsh Hadamard Transform engine, in accordance with an embodiment of the invention.

FIG. 10 is a flow chart that illustrates an exemplary computation process utilized by a Fast Walsh Hadamard Transform engine, in accordance with an embodiment of the invention. FIG. 10 describes a serial process for computing an inverse Fast Walsh Transform in a variable spreading factor inverse Fast Walsh Hadamard Transform engine 702, in accordance with an embodiment of the invention. Referring to FIG. 10, in step 1002, a spreading factors input vector may be generated. The spreading factors input vector may comprise values for spreading factors $SF_m$, corresponding to each user m, where the variable m is an index that may refer to data associated with the corresponding user. In step 1004, a data vector may be received. The data vector may have been received by a receiver 502 (FIG. 5), and decoded by a conjugate scrambling code block 504. The data vector may comprise a plurality of chips. In step 1006, a counter variable, Cntr, may be defined. The counter variable may be utilized to iteratively compute data bits, utilizing a method as depicted in equation [17]. Prior to the first iteration, the counter variable may be initialized Cntr=0, for example. For each iteration, the counter variable may be incremented, by 1 for example. In step 1006, an upper limit for the value Cntr may be defined, for example Cntr=7. In various embodiments of the invention, the iteration process may end based on the counter value reaching the upper limit value.

In step 1008, bits from the data vector, of step 1004, may be selected, along with the corresponding spreading factor, selected from the spreading factors input vector, of step 1002. In step 1010, a butterfly calculation may be performed. In step 1012, a bit vector may be output. The bit vector may correspond to estimated values for corresponding bits transmitted by at least a portion of the m users. Following step 1010, the counter value may be incremented. A check may be performed to compare the current counter value to the upper limit counter value. Based on the comparison, step 1008 may follow step 1006.

Aspects of a system for a variable spreading factor Fast Walsh Hadamard Transform computation may include a variable spreading factor Fast Walsh Hadamard Transform engine 602 that enables spread spectrum encoding of data from each of a plurality of data sources. A data source may correspond to a mobile terminal 102, for example. A plurality of spreading factors may be utilized wherein at least 2 of the plurality of spreading factors differ. The variable spreading factor Fast Walsh Hadamard Transform engine 602 may enable combination of a plurality of spread spectrum encoded data to form a data vector.

A scrambling code block 410 may enable scrambling of the data vector utilizing a scrambling code. A transmitter 412 may enable transmission of the scrambled data vector. A value for one of the plurality of spreading factors may be greater than or less than a value for one or more of the remainder of the plurality of spreading factors. The variable spreading factor Fast Walsh Hadamard Transform engine 602 may enable definition of a length for each of the plurality of data sources, and a corresponding value for each of the plurality of spreading factors. A spreading code corresponding to one of the plurality of spreading factors may produce a value of 0 when multiplied by a spreading code corresponding to each remaining one of the plurality of spreading factors.

The spreading factor may be represented in a matrix. The matrix may be represented as comprising a plurality of submatrices. Each of the submatrices may be a square matrix, a diagonal matrix, or a vector. The square matrix, and diagonal matrix, may each comprise matrix elements in 2 rows and 2 columns. The vector may comprise elements in 2 rows. Each matrix element in the square matrix may comprise a value equal to 1 or −1. Each diagonal matrix element in the diagonal matrix may comprise a value equal to 1 or −1. Each matrix element in the diagonal matrix that is not a diagonal matrix element may comprise a value equal to 0. Each element in the vector may comprise a value of 1 or −1.

The variable spreading factor Fast Walsh Hadamard Transform engine 602 may enable generation of a current intermediate result by multiplying data from one of the plurality of data sources by at least one of the plurality of submatrices. Each of the submatrices may be a square matrix, a diagonal matrix, or a vector. The variable spreading factor Fast Walsh Hadamard Transform engine 602 may enable generate of a subsequent intermediate result by multiplying subsequent data from the current intermediate result by a subsequent at least one of the plurality of submatrices. Each of the subsequent submatrices may be a square matrix, a diagonal matrix, or a vector. A portion of the data vector may be generated based on the subsequent intermediate result.

The variable spreading factor Fast Walsh Hadamard Transform engine 602 may utilize the method described above to enable generation of a corresponding portion of the data vector for each of the plurality of data sources. The variable spreading factor Fast Walsh Hadamard Transform engine 602 may enable computation of the data vector based on a plurality of the corresponding portions of the data vector.

A Walsh code is an exemplary spreading code that may be utilized in a variety of communications systems. Various embodiments of the invention may not be limited to spreading codes based on a Walsh code, buy may more generally comprise other spreading codes such as Gold codes, and orthogonal variable spreading factor (OSVF) codes.

The following is a listing of exemplary C programming code, which may be utilized for serial Fast Walsh Transform, and for serial inverse Fast Walsh Transform:

```
/*************************************************************/
void WalshButterfly(double *Buf,char Level)
{
  short LN = maxSF>>Level;
  for(short i=0;i<(maxSF/LN);i++)
  {
    for(short j=0;j<(LN/2);j++)
    {
      double x=Buf[i*LN     +j];
      double y=Buf[i*LN+(LN/2)+j];
      Buf[i*LN     +j] = x + y;
      Buf[i*LN+(LN/2)+j] = x - y;
    }
  }
}
/*************************************************************/
void WalshTransform(double *In,char *SFLevel,double *Out)
{
  for(short i=0;i<maxSF;i++)   Out[i]=0;
  for(char Level=0;Level<maxLevel;Level++)
  {
    double Gain = sqrt((double)(1<<Level));
    for(short i=0;i<maxSF;i++)
    {
      if(SFLevel[i]==Level)    Out[i]+=Gain*In[i];
    }
    WalshButterfly(Out,Level);
  }
  WalshButterfly(Out,maxLevel);
}
/*************************************************************/
```

The maxSF is defined equal to 256.
The (char *SFLevel)is pointer vector of Spreading Factors for each bit.
SFLevel[k]=0; If Spreading Factor of bit # k is 256
SFLevel[k]=1; If Spreading Factor of bit # k is 128
SFLevel[k]=2; If Spreading Factor of bit # k is 64
SFLevel[k]=3; If Spreading Factor of bit # k is 32
SFLevel[k]=4; If Spreading Factor of bit # k is 16
SFLevel[k]=5; If Spreading Factor of bit # k is 8
SFLevel[k]=6; If Spreading Factor of bit # k is 4

```
/*************************************************************/
void WalshButterfly(double *Buf,char Level)
{
  short LN = maxSF>>Level;
  for(short i=0;i<(maxSF/LN);i++)
  {
    for(short j=0;j<(LN/2);j++)
    {
      double x=Buf[i*LN     +j];
      double y=Buf[i*LN+(LN/2)+j];
      Buf[i*LN     +j] = x + y;
      Buf[i*LN+(LN/2)+j] = x - y;
    }
  }
}
/*************************************************************/
void InverseWalshTransform(double *In,char *SFLevel,double *Out)
{
  double Buf[maxSF];
  for(short i=0;i<maxSF;i++)    Buf[i]=In[i];
  for(short i=0;i<maxSF;i++)    Out[i]=0;
  WalshButterfly(Buf,maxLevel);
  for(char Level=maxLevel-1;Level>=0;Level--)
  {
    WalshButterfly(Buf,Level);
    double Gain = sqrt((double)(1<<Level))/maxSF;
    for(short i=0;i<maxSF;i++)
    {
      if(SFLevel[i]==Level)    Out[i] = Gain*Buf[i];
    }
  }
}
```

Accordingly, the present invention may be realized in hardware, software, or a combination of hardware and software. The present invention may be realized in a centralized fashion in at least one computer system, or in a distributed fashion where different elements are spread across several interconnected computer systems. Any kind of computer system or other apparatus adapted for carrying out the methods described herein is suited. A typical combination of hardware and software may be a general-purpose computer system with a computer program that, when being loaded and executed, controls the computer system such that it carries out the methods described herein.

The present invention may also be embedded in a computer program product, which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

While the present invention has been described with reference to certain embodiments, it will be understood by those skilled in the art that various changes may be made and equivalents may be substituted without departing from the scope of the present invention. In addition, many modifications may be made to adapt a particular situation or material to the teachings of the present invention without departing from its scope. Therefore, it is intended that the present invention not be limited to the particular embodiment disclosed, but that the present invention will include all embodiments falling within the scope of the appended claims.

What is claimed is:

1. A method for processing signals in a communication system, the method comprising:
   spread spectrum encoding data from each of a plurality of data sources utilizing a plurality of spreading factors wherein at least 2 of said plurality of spreading factors differ;
   combining a plurality of said spread spectrum encoded data to form a data vector;
   defining a length for said each of said plurality of data sources, and a corresponding value for each of said plurality of spreading factors, wherein a spreading code corresponding to one of said plurality of spreading factors produces a value of 0 when multiplied by a spreading code corresponding to each remaining one of said plurality of spreading factors, wherein said one of said plurality of spreading factors is represented in a matrix, wherein said matrix is represented as comprising a plurality of submatrices, wherein each of said plurality of submatrices is one of: a square matrix, a diagonal matrix, and a vector; and
   performing one or more operations, said one or more operations comprising:
      generating a current intermediate result by multiplying data from one of said plurality of data sources by at least one of said plurality of submatrices, wherein each of said at least one of said plurality of submatrices is one of: said square matrix, said diagonal matrix, and said vector;
      generating a subsequent intermediate result by multiplying subsequent data from said current intermediate result by a subsequent at least one of said plurality of submatrices wherein each of said subsequent at least one of said plurality of submatrices is one of: said square matrix, said diagonal matrix, and said vector; and
      generating a portion of said data vector based on said subsequent intermediate result.

2. The method according to claim 1, comprising scrambling said data vector utilizing a scrambling code.

3. The method according to claim 2, comprising transmitting said scrambled data vector.

4. The method according to claim 1, wherein a value for one of said plurality of spreading factors is, at least one of: greater than and less than, a value for at least one of a remainder of said plurality of spreading factors.

5. The method, according to claim 1, comprising generating a corresponding portion of said data vector for each one of said plurality of data sources.

6. The method according to claim 5, comprising computing said data vector based on a plurality of said corresponding portion of said data vector.

7. A method for processing signals in a communication system, the method comprising:
   spread spectrum encoding data from each of a plurality of data sources utilizing a plurality of spreading factors wherein at least 2 of said plurality of spreading factors differ;
   combining a plurality of said spread spectrum encoded data to form a data vector; and
   defining a length for said each of said plurality of data sources, and a corresponding value for each of said plurality of spreading factors, wherein a spreading code corresponding to one of said plurality of spreading factors produces a value of 0 when multiplied by a spreading code corresponding to each remaining one of said plurality of spreading factors, wherein said one of said plurality of spreading factors is represented in a matrix, wherein said matrix is represented as comprising a plurality of submatrices, wherein each of said plurality of submatrices is one of: a square matrix, a diagonal matrix, and a vector, wherein said square matrix comprises 2 rows and 2 columns wherein said 2 rows and 2 columns further comprises:
   a value equal to one of: 1 and −1, in a first row and a first column;
   a value equal to one of: 1 and −1, in said first row and a second column;
   a value equal to one of: 1 and −1, in a second row and said first column; and
   a value equal to one of: 1 and −1, in said second row and said second column.

8. A method for processing signals in a communication system, the method comprising:
   spread spectrum encoding data from each of a plurality of data sources utilizing a plurality of spreading factors wherein at least 2 of said plurality of spreading factors differ;
   combining a plurality of said spread spectrum encoded data to form a data vector; and
   defining a length for said each of said plurality of data sources, and a corresponding value for each of said plurality of spreading factors, wherein a spreading code corresponding to one of said plurality of spreading factors produces a value of 0 when multiplied by a spreading code corresponding to each remaining one of said plurality of spreading factors, wherein said one of said plurality of spreading factors is represented in a matrix, wherein said matrix is represented as comprising a plurality of submatrices, wherein each of said plurality of submatrices is one of: a square matrix, a diagonal matrix, and a vector, wherein said diagonal matrix comprises 2 rows and 2 columns wherein said 2 rows and 2 columns further comprises:
   a value equal to one of: 1 and −1, in a first row and a first column;
   a value of 0 in said first row and a second column;
   a value of 0 in a second row and said first column; and
   a value equal to one of: 1 and −1, in said second row and said second column.

9. A method for processing signals in a communication system, the method comprising:

spread spectrum encoding data from each of a plurality of data sources utilizing a plurality of spreading factors wherein at least 2 of said plurality of spreading factors differ;

combining a plurality of said spread spectrum encoded data to form a data vector; and defining a length for said each of said plurality of data sources, and a corresponding value for each of said plurality of spreading factors, wherein a spreading code corresponding to one of said plurality of spreading factors produces a value of 0 when multiplied by a spreading code corresponding to each remaining one of said plurality of spreading factors, wherein said one of said plurality of spreading factors is represented in a matrix, wherein said matrix is represented as comprising a plurality of submatrices, wherein each of said plurality of submatrices is one of: a square matrix, a diagonal matrix, and a vector, wherein said vector comprises 2 rows wherein said 2 rows further comprise:

a value equal to one of: 1 and −1, in a first row; and a value equal to one of: 1 and −1, in a second row.

10. A system for processing signals in a communication system, the system comprising:

one or more circuits that are enable to perform spread spectrum encoding of data from each of a plurality of data sources utilizing a plurality of spreading factors wherein at least 2 of said plurality of spreading factors differ;

said one or more circuits are operable to combine a plurality of said spread spectrum encoded data to form a data vector;

wherein said one or more circuits are operable define a length for said each of said plurality of data sources, and a corresponding value for each of said plurality of spreading factors; wherein a spreading code corresponding to one of said plurality of spreading factors produces a value of 0 when multiplied by a spreading code corresponding to each remaining one of said plurality of spreading factors; wherein said one of said plurality of spreading factors is represented in a matrix; wherein said matrix is represented as comprising a plurality of submatrices; wherein each of said plurality of submatrices is one of: a square matrix, a diagonal matrix, and a vector;

wherein said one or more circuits are operable to perform one or more operation, said one or more operations comprising:

generation of a current intermediate result by multiplying data from one of said plurality of data sources by at least one of said plurality of submatrices, wherein each of said at least one of said plurality of submatrices is one of: said square matrix, said diagonal matrix, and said vector;

generation of a subsequent intermediate result by multiplying subsequent data from said current intermediate result by a subsequent at least one of said plurality of submatrices wherein each of said subsequent at least one of said plurality of submatrices is one of: said square matrix, said diagonal matrix, and said vector; and generation of a portion of said data vector based on said subsequent intermediate result.

11. The system according to claim 10, wherein said one or more circuits are operable to scramble said data vector utilizing a scrambling code.

12. The system according to claim 11, wherein said one or more circuits are operable to transmit said scrambled data vector.

13. The system according to claim 10, wherein a value for one of said plurality of spreading factors is, at least one of: greater than and less than, a value for at least one of a remainder of said plurality of spreading factors.

14. The system, according to claim 10, wherein said one or more circuits are operable to generate a corresponding portion of said data vector for each one of said plurality of data sources.

15. The system according to claim 14, wherein said one or more circuits are operable to compute said data vector based on a plurality of said corresponding portion of said data vector.

16. A system for processing signals in a communication system, the system comprising:

One or more circuits that are enable to perform spread spectrum encoding of data from each of a plurality of data sources utilizing a plurality of spreading factors wherein at least 2 of said plurality of spreading factors differ;

said One or more circuits are operable to combine a plurality of said spread spectrum encoded data to form a data vector;

wherein said one or more circuits are operable define a length for said each of said plurality of data sources, and a corresponding value for each of said plurality of spreading factors; wherein a spreading code corresponding to one of said plurality of spreading factors produces a value of 0 when multiplied by a spreading code corresponding to each remaining one of said plurality of spreading factors; wherein said one of said plurality of spreading factors is represented in a matrix; wherein said matrix is represented as comprising a plurality of submatrices; wherein each of said plurality of submatrices is one of: a square matrix, a diagonal matrix, and a vector;

wherein said square matrix comprises 2 rows and 2 columns wherein said 2 rows and 2 columns further comprises:

a value equal to one of: 1 and −1, in a first row and a first column;

a value of 0 in said first row and a second column;

a value of 0 in a second row and said first column; and a value equal to one of: 1 and −1, in said second row and said second column.

17. A system for processing signals in a communication system, the system comprising:

One or more circuits that are enable to perform spread spectrum encoding of data from each of a plurality of data sources utilizing a plurality of spreading factors wherein at least 2 of said plurality of spreading factors differ;

said One or more circuits are operable to combine a plurality of said spread spectrum encoded data to form a data vector;

wherein said one or more circuits are operable define a length for said each of said plurality of data sources, and a corresponding value for each of said plurality of spreading factors; wherein a spreading code corresponding to one of said plurality of spreading factors produces a value of 0 when multiplied by a spreading code corresponding to each remaining one of said plurality of spreading factors; wherein said one of said plurality of spreading factors is represented in a matrix; wherein said matrix is represented as comprising a plurality of submatrices; wherein each of said plurality of submatrices is one of: a square matrix, a diagonal matrix, and a vector;

wherein said diagonal matrix comprises 2 rows and 2 columns wherein said 2 rows and 2 columns further comprises:
  a value equal to one of: 1 and −1, in a first row and a first column;
  a value of 0 in said first row and a second column;
  a value of 0 in a second row and said first column; and
  a value equal to one of: 1 and −1, in said second row and said second column.

18. A system for processing signals in a communication system, the system comprising:
  One or more circuits that are enable to perform spread spectrum encoding of data from each of a plurality of data sources utilizing a plurality of spreading factors wherein at least 2 of said plurality of spreading factors differ;
  said One or more circuits are operable to combine a plurality of said spread spectrum encoded data to form a data vector;
  wherein said one or more circuits are operable define a length for said each of said plurality of data sources, and a corresponding value for each of said plurality of spreading factors; wherein a spreading code corresponding to one of said plurality of spreading factors produces a value of 0 when multiplied by a spreading code corresponding to each remaining one of said plurality of spreading factors; wherein said one of said plurality of spreading factors is represented in a matrix; wherein said matrix is represented as comprising a plurality of submatrices; wherein each of said plurality of submatrices is one of: a square matrix, a diagonal matrix, and a vector;
  wherein said vector comprises 2 rows wherein said 2 rows further comprise:
  a value equal to one of: 1 and −1, in a first row; and
  a value equal to one of: 1 and −1, in a second row.

* * * * *

UNITED STATES PATENT AND TRADEMARK OFFICE
CERTIFICATE OF CORRECTION

PATENT NO. : 7,653,029 B2
APPLICATION NO. : 11/452009
DATED : January 26, 2010
INVENTOR(S) : Arkady Molev-Shteiman It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 726 days.

Signed and Sealed this

Twenty-third Day of November, 2010

David J. Kappos
*Director of the United States Patent and Trademark Office*